US010446982B2

(12) United States Patent
Fukumoto et al.

(10) Patent No.: US 10,446,982 B2
(45) Date of Patent: Oct. 15, 2019

(54) ELECTRICAL CONNECTOR AND LOCKING MEMBER OF ELECTRICAL CONNECTOR

(71) Applicant: DAI-ICHI SEIKO CO.,LTD., Kyoto-shi, Kyoto (JP)

(72) Inventors: Yasuaki Fukumoto, Machida (JP); Satoru Taguchi, Machida (JP)

(73) Assignee: DAI-ICHI SEIKO CO., LTD., Kyoto-shi, Kyoto (JP)

( * ) Notice: Subject to any disclaimer, the term of this patent is extended or adjusted under 35 U.S.C. 154(b) by 0 days.

(21) Appl. No.: 15/873,897

(22) Filed: Jan. 18, 2018

(65) Prior Publication Data

US 2018/0212363 A1 Jul. 26, 2018

(30) Foreign Application Priority Data

Jan. 20, 2017 (JP) ................................ 2017-008749
Nov. 28, 2017 (JP) ................................ 2017-227677

(51) Int. Cl.
*H01R 12/00* (2006.01)
*H02K 1/00* (2006.01)
(Continued)

(52) U.S. Cl.
CPC ......... *H01R 13/639* (2013.01); *H01R 9/0515* (2013.01); *H01R 12/7082* (2013.01);
(Continued)

(58) Field of Classification Search
CPC ........ H01R 24/40; H01R 24/50; H01R 13/56; H01R 24/00
(Continued)

(56) References Cited

U.S. PATENT DOCUMENTS 7,549,868 B1 * 6/2009 Ho ........................ H01R 13/111
439/63
7,648,394 B2 * 1/2010 Yotsutani ............. H01R 12/718
439/581
(Continued)

FOREIGN PATENT DOCUMENTS

CN 101075714 11/2007
CN 201054430 4/2008
(Continued)

OTHER PUBLICATIONS

Extended Search Report in corresponding European Application No. 18152055.2, dated May 2, 2018, 9 pages.

*Primary Examiner* — Abdullah A Riyami
*Assistant Examiner* — Thang H Nguyen
(74) *Attorney, Agent, or Firm* — Soei Patent & Law Firm

(57) ABSTRACT

An electrical connector includes a plug connector and a locking member. The plug connector includes a conductive outer conductor shell electrically connected to a contact of a mating connector, and the outer conductor shell includes a cylindrical fitting portion fitted to a ground contact member. An outer diameter of the fitting portion is configured to be enlarged when the fitting portion is attached to or removed from the ground contact member, and the locking member includes a regulation portion capable of regulating the enlargement of the fitting portion. A guide portion is configured to guide the movement of the regulation portion with respect to the fitting portion, as the regulation portion is moved between a regulation position and a standby position.

26 Claims, 17 Drawing Sheets

(51) Int. Cl.

| | |
|---|---|
| ***H01R 9/05*** | (2006.01) |
| ***H01R 13/639*** | (2006.01) |
| ***H01R 12/75*** | (2011.01) |
| ***H01R 24/50*** | (2011.01) |
| ***H01R 12/70*** | (2011.01) |
| ***H01R 13/623*** | (2006.01) |
| ***H01R 13/627*** | (2006.01) |
| ***H01R 13/629*** | (2006.01) |
| ***H01R 13/703*** | (2006.01) |
| ***H01R 24/40*** | (2011.01) |
| *H01R 103/00* | (2006.01) |

(52) U.S. Cl.
CPC ........... *H01R 12/75* (2013.01); *H01R 13/623* (2013.01); *H01R 13/627* (2013.01); *H01R 13/629* (2013.01); *H01R 13/7031* (2013.01); *H01R 24/40* (2013.01); *H01R 24/50* (2013.01); *H01R 9/0518* (2013.01); *H01R 2103/00* (2013.01)

(58) Field of Classification Search
USPC ........................................... 439/63, 581, 582
See application file for complete search history.

(56) References Cited

U.S. PATENT DOCUMENTS

| | | | | |
|---|---|---|---|---|
| 8,628,362 | B2 * | 1/2014 | Maki | H01R 13/639 439/347 |
| 9,033,732 | B2 * | 5/2015 | Hashiguchi | H01R 4/182 439/581 |
| 9,059,521 | B2 * | 6/2015 | Chen | H01R 9/0515 |
| 9,502,834 | B2 * | 11/2016 | Hashimoto | H01R 24/44 |
| 9,692,174 | B1 * | 6/2017 | Yu | H01R 13/622 |
| 9,780,488 | B2 * | 10/2017 | Fu | H01R 4/4827 |
| 9,793,623 | B2 * | 10/2017 | Chen | H01R 9/0518 |
| 9,929,519 | B1 * | 3/2018 | Hall | H01R 13/405 |
| 2005/0136701 | A1 * | 6/2005 | Ikeda | H01R 24/40 439/63 |
| 2008/0096420 | A1 * | 4/2008 | Zeng | H01R 9/0518 439/582 |
| 2012/0252282 | A1 | 10/2012 | Maki | |
| 2014/0017928 | A1 * | 1/2014 | Shah | H01R 13/6277 439/350 |
| 2014/0038464 | A1 * | 2/2014 | Tsai | H01R 13/516 439/626 |
| 2014/0106581 | A1 * | 4/2014 | Hashiguchi | H01R 4/182 439/77 |
| 2014/0318860 | A1 * | 10/2014 | Kuji | H01R 13/639 174/72 A |
| 2016/0141784 | A1 * | 5/2016 | Hashiguchi | H01R 24/50 439/626 |

FOREIGN PATENT DOCUMENTS

| | | |
|---|---|---|
| CN | 102709744 | 10/2012 |
| CN | 102842838 | 12/2012 |
| CN | 104124581 | 10/2014 |
| JP | H8-017523 | 1/1996 |
| JP | 2005-183212 | 7/2005 |
| JP | 2012-204260 | 10/2012 |
| JP | 2015-207350 | 11/2015 |
| JP | 2016-100190 | 5/2016 |
| JP | 2016-110709 | 6/2016 |
| KR | 1020050062381 | 6/2005 |
| KR | 1020080015326 | 2/2008 |
| TW | 200522443 | 7/2005 |

* cited by examiner

X
Y
Z
30
31
32
33
34
34a
34b
35
36
37
37(32)
38(32)
39
39a
39b
40
40a
41
42
43
44

530
531
532
533
534
535
536
537
538
539
X
Y
Z

ELECTRICAL CONNECTOR AND LOCKING MEMBER OF ELECTRICAL CONNECTOR

CROSS-REFERENCE TO RELATED APPLICATION

This application is based upon and claims the benefit of priority from Japanese Patent Application No. 2017-008749, filed on Jan. 20, 2017, and Japanese Patent Application No. 2017-227677, filed on Nov. 28, 2017, the entire contents of which are incorporated herein by reference.

TECHNICAL FIELD

The present disclosure relates to an electrical connector and a locking member of an electrical connector.

BACKGROUND

In an electrical connector, it is important to securely maintain a state of engagement with respect to a mating connector which is electrically connected thereto. Generally, the state of engagement with respect to the mating connector in the electrical connector is maintained by a spring force or the like for each contact of the connectors (for example, Japanese Unexamined Patent Publication No. 2005-183212).

SUMMARY

Disclosed herein is a state of engagement for a mating connector that is securely maintained in accordance with the use of an electrical connector. In order to securely maintain the state of engagement, for example, a method of using an adhesive after the fitting is considered, but when the adhesive is used, a removal operation becomes difficult in the state of engagement. In this way, a series of operations such as an operation of securely maintaining the state of engagement and an operation of inserting (connecting) and removing (disconnecting) the electrical connector may be complicated. Here, the present disclosure describes an electrical connector and a locking member of an electrical connector capable of securely maintaining a state of engagement without requiring a complicated series of additional operations.

According to some example embodiments of the present disclosure, an electrical connector includes a first connector and a locking member attached to the first connector. The first connector may include a first contact having a conductive property and electrically connected to a contact of a second connector which is a mating connector. The first contact may include a cylindrical fitting portion fitted to the contact of the second connector, and an outer diameter of the fitting portion may be configured to be increased when the fitting portion is attached to and removed from the contact of the second connector. The locking member may include a regulation portion configured to regulate the enlargement of the fitting portion when the fitting portion is removed from the contact of the second connector. Additionally, the locking member may include a guide portion that guides the movement of the regulation portion with respect to the fitting portion. The guide portion may be configured to guide the movable regulation portion between a regulation position associated with regulating the enlargement of the fitting portion and a standby position which may not be associated with regulating the enlargement.

In some example electrical connectors according to the present disclosure, the regulation portion of the locking member can regulate an increase in outer diameter of the fitting portion. Accordingly, since the enlargement of the fitting portion fitted to the second connector is suppressed, it is possible to securely maintain the state of engagement between the first connector and the second connector. Further, in some electrical connectors according to the present disclosure, the guide portion of the locking member guides the movable regulation portion between the regulation position and the standby position. Accordingly, for example, the insertion (connection) and the removal (disconnection) of the fitting portion to or from the contact can be easily performed while the regulation portion is located at the standby position. Then, when connecting the fitting portion of the first connector to the contact of the second connector, the state of engagement can be securely maintained while the regulation portion is located at the regulation position. That is, it is possible to securely maintain the state of engagement between the first connector and the second connector while allowing for the continued ability to readily insert and remove the first connector.

The regulation portion may include a pair of arm portions which regulates the enlargement of the fitting portion by sandwiching the fitting portion from the outside in the radial direction. Since the fitting portion is sandwiched from the outside in the radial direction, which is a direction in which the diameter of the fitting portion is widened, it is possible to effectively regulate the enlargement of the fitting portion. That is, it is possible to further securely maintain the state of engagement between the first connector and the second connector.

A gap between the pair of arm portions may be narrower than the outer diameter of the fitting portion when it is enlarged. Accordingly, it is possible to simply and easily regulate the enlargement of the fitting portion by sandwiching the fitting portion between the pair of arm portions.

The guide portion may guide the movement of the regulation portion in a direction intersecting (e.g., perpendicular to) the direction of engagement of the fitting portion. Since the movement of the regulation portion is guided in a direction different from the direction of engagement, it is possible to clearly distinguish the fitting/engagement operation and the locking operation as different operations and thus to improve the functionality of the connector.

The first connector may be attached to one end of a cable and the guide portion may guide the movement of the regulation portion in the axial direction of the cable. Since the movement of the regulation portion is guided in the axial direction of the cable, the cable does not inhibit the movement of the regulation portion and the regulation portion can be easily moved. Thus, the functionality can be improved.

The first connector may include a lid portion covering a surface of the first connector opposite to the side that contacts the second connector in the direction of engagement of the fitting portion. Additionally, the first connector may include a rail portion that is provided in the lid portion that is configured to extend in the axial direction of the first connector. The guide portion may include a sliding portion extending in the axial direction that is configured to slide along the rail portion to guide the movement of the regulation portion in the axial direction. Since the sliding portion moves along the rail portion of the first connector, it is possible to simply and easily move the regulation portion with respect to the fitting portion.

The sliding portion may be engaged to the rail portion by a first protrusion portion that engages with an engagement portion after a position of the regulation portion reaches the regulation position by the sliding of the sliding portion. In some example connectors the sliding portion may comprise the first protruding portion and the rail portion may comprise the engagement portion, whereas in other example connectors the configuration may be reversed. Since the first protrusion portion engages with the engagement portion, the operator can feel a sensation of clicking and thus the operator can detect a state of engagement when the regulation portion has been placed in the regulation position.

The guide portion may be provided to face the pair of awl portions in the direction of engagement and to hold the sliding portion. Additionally, the guide portion may include a flat portion provided to cover the lid portion, and the flat portion may be provided with an opening. Accordingly, since it is possible to visually recognize the positions of the pair of arm portions (e.g., the regulation portions) with respect to the first connector from the opening when sliding the sliding portion, the operator can detect the position of the regulation portion.

The guide portion may include a pair of extension portions that extend from the pair of arm portions of the regulation portion. The pair of extension portions may be disposed to sandwich the fitting portion from the outside in the radial direction while the regulation portion is disposed at the standby position, and a gap between the pair of extension portions may be wider than a gap between the pair of arm portions. Since the extension portions may be configured to extend contiguously from the arm portions and to sandwich the fitting portion while the regulation portion is disposed at the standby position, it is possible to further appropriately guide the movement of the arm portion (e.g., the regulation portion) with respect to the fitting portion. Further, since the gap between the pair of extension portions is wider than the gap between the pair of arm portions, it is possible to allow the enlargement of the fitting portion in a state of operation where the regulation portion is disposed at the standby position, that is, while the extension portions sandwich the fitting portion.

The guide portion may include a pair of extension portions extending from the pair of arm portions of the regulation portion, and the pair of extension portions may sandwich the fitting portion from the outside in the radial direction when the regulation portion is disposed at the standby position. In some example connectors, the rigidity of the pair of extension portions may be lower than the rigidity of the pair of aim portions. Since the extension portions may be configured to extend contiguously from the arm portions and to sandwich the fitting portion when the regulation portion is disposed at the standby position, it is possible to further appropriately guide the movement of the arm portion (e.g., the regulation portion) with respect to the fitting portion. Further, since the rigidity of the extension portion is lower than the rigidity of the arm portion, it is possible to allow the enlargement of the fitting portion while the regulation portion is disposed at the standby position, that is, while the extension portions sandwich the fitting portion.

At least one of the pair of extension portions may include a second protrusion portion that may be contiguously provided at an end portion of the extension portion opposite to the atm portion. While contacting the fitting portion, the second protrusion portion may be configured to prevent the fitting portion from passing between the pair of extension portions. Since the second protrusion portion is provided at the end portion of the extension portion and the second protrusion portion is configured to prevent the passage of the fitting portion, the separation of the locking member from the first connector may be prevented.

The first connector may be a plug-type connector attached to one end of a coaxial cable, the second connector may be a receptacle-type connector mounted on a substrate electrically connected to the coaxial cable and fitted to the plug connector, and the contact of the second connector may be a ground contact connected to a ground terminal of the substrate. Accordingly, it is possible to securely maintain the state of engagement between the receptacle-type connector and the plug-type connector of the coaxial cable by using the locking member.

The locking member according to some example embodiments of the present disclosure includes a regulation portion capable of regulating the enlargement of the cylindrical fitting portion which is electrically connected and fitted to the contact of the mating connector. The outer diameter of the cylindrical fitting portion is increased when the electrical connector is attached to and removed from the mating connector and a guide portion guides the movement of the regulation portion with respect to the fitting portion. Additionally, the regulation portion is configured to regulate the enlargement of the fitting portion when removing the fitting portion from the mating connector, and the guide portion guides the movement of the regulation portion between the regulation position and the standby position.

The electrical connector according to some example embodiments of the present disclosure includes a first connector and a locking member attached to the first connector. The first connector includes a first contact that has a conductive property and that is electrically connected to a contact of a second connector corresponding to a mating connector. The first contact includes a cylindrical fitting portion fitted to the contact of the second connector, and the fitting portion has a slit faulted in a side surface in a direction of engagement (hereinafter, referred to as a "direction of engagement"). The fitting portion is configured to be enlarged while being widened in the radial direction by using the slit as a boundary when the fitting portion is attached to and removed from the contact of the second connector. The locking member includes a pair of arm portions capable of regulating the enlargement of the fitting portion by sandwiching the fitting portion from the outside in the radial direction. Additionally, the pair of arm portions includes a pair of projection portions which extend toward the slit along the fitting portion.

In some example electrical connectors according to the present disclosure, the pair of arm portions of the locking member is configured to regulate the enlargement of the fitting portion. Accordingly, since the enlargement of the fitting portion fitted to the second connector is suppressed, it is possible to securely maintain the connection, or the state of engagement, between the first connector and the second connector. Here, the fitting portion can be enlarged while being widened by using the slit as a boundary. For this reason, the size of the slit may be controlled in order to effectively suppress the enlargement. In this regard, in some electrical connectors according to the present disclosure, the pair of arm portions includes the projection portions extending toward the slit along the fitting portion, and the fitting portion in the vicinity of the slit is pressed by the projection portions. Accordingly, since the enlargement of the fitting portion is further appropriately suppressed, it is possible to further securely maintain the state of engagement between the first connector and the second connector. Further, in the electrical connector according to the present disclosure, since the enlargement of the fitting portion is regulated by the locking member, it is possible to easily perform a removal operation by releasing the fitting portion enlargement regulation state using the locking member even when the removal operation is needed after the fitting. That is, according to some electrical connectors of the present disclosure, it is possible to more easily perform a series of operations relating to the inserting (connecting) operation and maintaining the state of engagement as compared to connectors which rely on an adhesive.

In some example connectors, the first connector may be configured to be attached to one end of a cable and the locking member may be configured to move along the axial direction corresponding to the extension direction of the cable. In this way, since the locking is realized by moving the locking member in a direction (e.g., the axial direction of the cable) that is different from the direction of engagement of the electrical connector, it is possible to clearly distinguish the fitting/engagement operation and the locking operation and thus to improve the functionality.

In some example embodiments, the locking member may further include a guide portion configured to guide the movement of the pair of arm portions from a standby position, in which the pair of arm portions is located near a base end of the cable in relation to the fitting portion in the axial direction, to a regulation position, in which the pair of arm portions sandwiches the fitting portion from the outside in the radial direction. Accordingly, for example, when inserting and removing the fitting portion to and from the second contact, the insertion and the removal can be easily performed while the pair of arm portions is located at the standby position. Then, when fitting the fitting portion of the first connector to the contact of the second connector, the state of engagement can be securely maintained while the pair of arm portions is located at the regulation position. That is, it is possible to securely maintain the state of engagement between the first connector and the second connector while allowing for the continued ability to readily connect and disconnect the first connector. Further, since the standby position is set to a (rear) position near the base end of the cable in relation to the fitting portion, the pair of arm portions is not disposed at the front of the fitting portion during the locking operation, in which the pair of arm portions is moved from the standby position to the regulation position. Accordingly, by disposing the locking member at the rear area of the first connector in the substrate, it is possible to mount other electronic components on the front area in the substrate and to improve the mounting efficiency of the substrate.

In some example connectors, the first contact may include a lid portion covering an opening opposite to an opening that is configured to receive the contact of the second connector in the fitting portion, and a rail portion that contiguously extends from the lid portion in the axial direction. Additionally, the guide portion may include a sliding portion that extends in the axial direction and is configured to slide along the rail portion to guide the movement of the pair of arm portions in the axial direction. Since the sliding portion moves along the rail portion of the first connector, it is possible to easily move the pair of arm portions.

In some example connectors, the sliding portion may cover the rail portion from the outside and engage with the rail portion. Since the sliding portion engages with the rail portion, it is possible to suppress or prohibit the separation of the locking member from the first connector in the direction of engagement.

In some example connectors, the first contact may further include a clamping portion provided to sandwich the cable at a position near a base end of the cable in relation to the fitting portion in the axial direction. The projection portion may be configured to contact the clamping portion while regulating the enlargement of the fitting portion. In this way, since the projection portion that extends toward the slit along the fitting portion may be configured to contact the clamping portion, the projection portion is sandwiched between the fitting portion and the clamping portion. Accordingly, since the position of the projection portion that regulates the enlargement in the vicinity of the slit is easily fixed, it is possible to further securely maintain the state of engagement between the first connector and the second connector.

In some example connectors, the pair of arm portions may be configured to be elastically deformable in a vertical direction (i.e., the direction of engagement). Since the pair of arm portions is configured to be elastically deformable, the projection portion may be configured to be moved over other components even when the projection portion interferes with other components (for example, the clamping portion) while sliding the pair of arm portions. That is, it is possible to further easily move the pair of arm portions.

Accordingly, it is possible to provide an electrical connector and a locking member of the electrical connector capable of securely maintaining a state of engagement while also maintaining the functionality of the connector.

DETAILED DESCRIPTION

First Group of Example Embodiments

Figure 1:
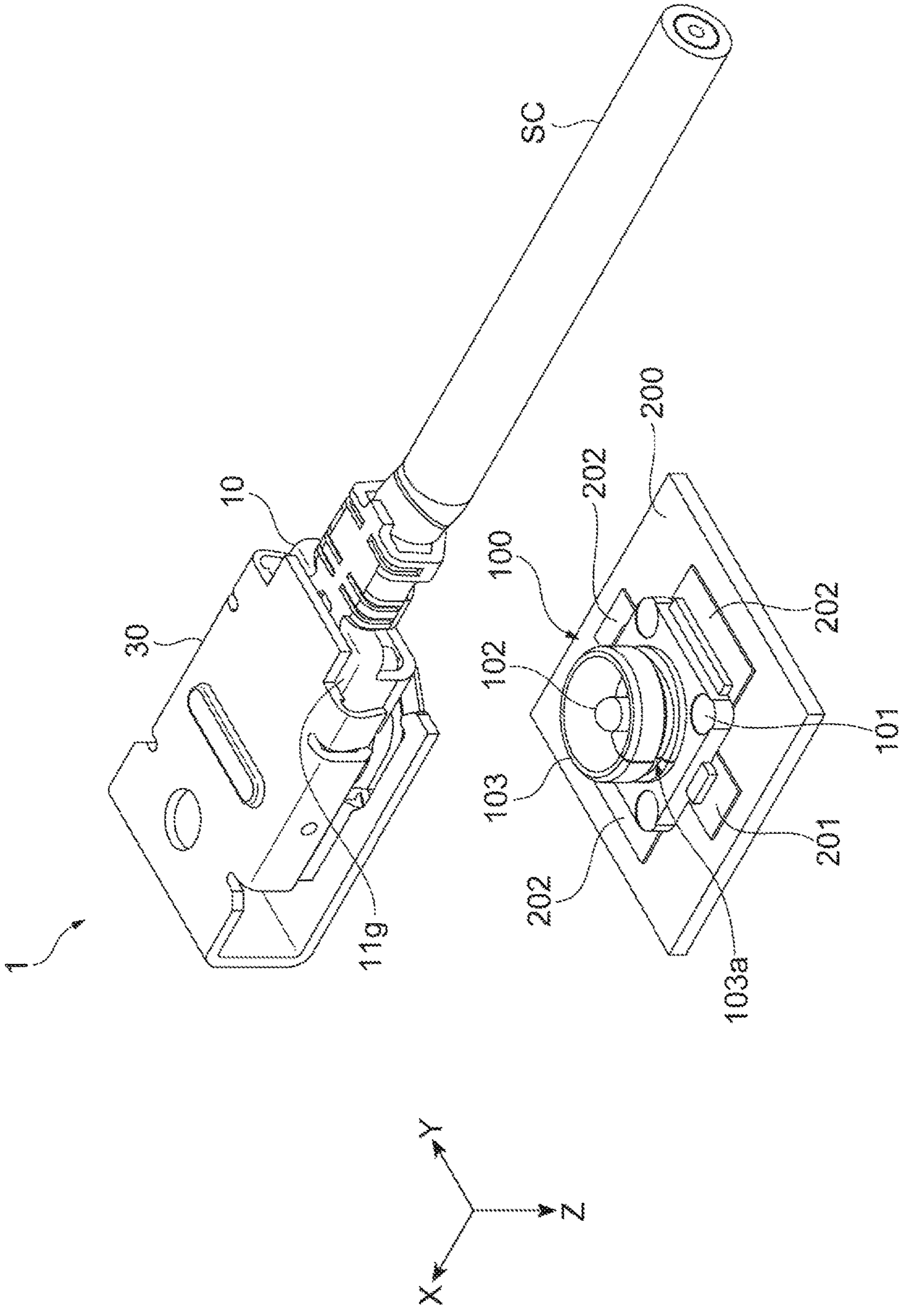
FIG. 1 is a perspective view of an electrical connector according to a first group of example embodiments of the present disclosure.

In the description below, a repetitive description will be omitted by using the same reference numerals for the same components or components having the same function.

[Outline of Electrical Connector]

An outline of an example electrical connector will be described with reference to FIG. 1. As shown in FIG. 1, an electrical connector 1 includes a plug connector 10 (a first connector) and a locking member 30. The electrical connector 1 may be configured to electrically connect a cable-shaped signal transmission medium to an electric circuit of a substrate and is, for example, a RF (Radio Frequency) connector. The signal transmission medium may be configured to transmit signals of various electronic devices such as a cellular phone and is, for example, a coaxial cable SC. The substrate is, for example, a printed wiring board 200. That is, the electrical connector 1 of the embodiment is a coaxial electrical connector which electrically connects the coaxial cable SC to an electric circuit of the printed wiring board 200. In the electrical connector 1, when a plug connector 10 attached to a terminal portion of the coaxial cable SC is fitted to a receptacle connector 100 mounted on the printed wiring board 200, the coaxial cable SC and the electric circuit of the printed wiring board 200 are electrically connected to each other.

Additionally, in some example embodiments the axial direction of the coaxial cable SC is understood as being in an "X direction", the direction of engagement between the plug connector 10 and the receptacle connector 100 when the plug connector 10 and the receptacle connector 100 are fitted to each other is a "Z direction", and a direction orthogonal to the X direction and the Z direction is a "Y direction". Further, in some example embodiments, an attachment end portion of the plug connector 10 in the coaxial cable SC in the X direction may be considered a "front end" and an opposite end portion may be considered a "rear end". Further, the "top" of the plug connector 10 which is visible in FIG. 1 may be understood as being on an opposite side from the "bottom" of the plug connector 10 which faces the receptacle connector 100 in the Z direction.

[Plug Connector]

Next, further details of the plug connector 10 will be described with reference to FIGS. 2A to 2D. The plug connector 10 may be attached to one end (e.g., the front end) of the coaxial cable SC. As shown in FIG. 2A to FIG. 2D, the plug connector 10 includes an outer conductor shell 11 (e.g., a first contact) having a conductive property, an insulation housing 12 having an insulation property, and an inner conductor contact 13. Hereinafter, the coaxial cable SC to which the plug connector 10 is attached will be described in detail together with the outer conductor shell 11, the insulation housing 12, and the inner conductor contact 13 constituting the plug connector 10.

(Coaxial Cable)

The coaxial cable SC may comprise a wire which is used in a small terminal such as a cellular phone in order to transmit a high-frequency signal among various signal processing elements (for example, an antenna, a control chip for controlling the antennal, a substrate, and the like) built-in the small terminal. The coaxial cable SC includes an inner conductor SC1 (see FIG. 2C), an insulator which is provided in the periphery of the inner conductor SC1, an outer conductor which is provided in the periphery of the insulator, and a protection coating which is provided in the periphery of the outer conductor. In the coaxial cable SC, the outer conductor, the insulator, and the inner conductor SC1 are exposed stepwise in this order as it goes toward the front end to which the plug connector 10 is attached.

In some example embodiments, the inner conductor SC1 is electrically connected to a signal contact member 102 (to be described later) of the receptacle connector 100 connected to a signal terminal 201 of the printed wiring board 200 through the inner conductor contact 13, thereby obtaining a signal transmission circuit. Further, the outer conductor of the coaxial cable SC is electrically connected to a ground contact member 103 (to be described later) of the receptacle connector 100 connected to a ground terminal 202 of the printed wiring board 200 though the outer conductor shell 11, thereby obtaining a ground circuit.

(Outer Conductor Shell)

The outer conductor shell 11 may comprise a conductive ground contact member electrically connected to the outer conductor of the coaxial cable SC. The outer conductor shell 11 is provided to cover the periphery of the insulation housing 12 as shown in FIG. 2D. The outer conductor shell 11 is electrically connected to the ground contact member 103 (e.g., a second contact, see FIG. 1) of the receptacle connector 100 (e.g., the second connector) which is a mating connector, thereby obtaining a ground circuit. The outer conductor shell 11 is formed by, for example, a thin plate-shaped metal member. The outer conductor shell 11 includes a fitting portion 11*a*, a lid portion 11*b*, and a rail portion 11*e*.

The fitting portion 11*a* may be formed in a cylindrical shape (a tubular shape) in which the Z direction is the axial direction and the insulation housing 12 is coaxially accommodated in a cylindrical hole. An inner peripheral surface of the fitting portion 11*a* contacts an outer peripheral surface of the insulation housing 12. A projection portion 11*c* which projects inward in the radial direction (toward the center side of the cylindrical shape of the fitting portion 11*a*) along the entire circumference is provided at the lower end of the fitting portion 11*a* (see FIG. 2C). The fitting portion 11*a* is fitted to the ground contact member 103 of the receptacle connector 100 when the projection portion 11*c* engages with a concave portion 103*a* (see FIG. 1) formed in the outer periphery of the ground contact member 103 of the receptacle connector 100 (additional details will be described later). An outer diameter of the fitting portion 11*a* is configured to increase when the fitting portion 11*a* is attached to (connected) and removed from (disconnected) the ground contact member 103 of the receptacle connector 100. By way of illustrative example only, the outer diameter in a state where the fitting portion 11*a* is not enlarged may be, for example, about 2.5 mm and the outer diameter in a state where the fitting portion 11*a* is enlarged may be, for example, about 2.7 mm. In some example connectors, the fitting portion 11*a* can be attached to and removed from the ground contact member 103 in an enlarged state and cannot be attached to and removed from the ground contact member 103 in a non-enlarged state.

The lid portion 11*b* is a portion which covers an upper surface of the fitting portion 11*a*. The lid portion 11*b* is integrally formed with the fitting portion 11*a*. The lid portion 11*b* is provided with the rail portion 11*e* extending in the X direction.

The lid portion 11*b* includes a fixed portion 11*f* and a cover portion 11*g*. The fixed portion 11*f* is a portion in which the plug connector 10 is attached to the coaxial cable SC. The fixed portion 11*f* is provided along the coaxial cable SC. The fixed portion 11*f* is configured to be bendable and is a plate-shaped member having a U-shape when at rest. The fixed portion 11*f* covers the outer peripheries of the protection coating and the outer conductor of the coaxial cable SC and the front end is clamped to be fixed to the coaxial cable SC so that the plug connector 10 is attached to the coaxial cable SC. The cover portion 11*g* covers and closes an opening portion of the upper surface of the fitting portion 11*a*.

The rail portion 11*e* is integrally formed with the cover portion 11*g* and extends in the X direction. The rail portion 11*e* is provided in substantially the entire length of the cover portion 11*g* in the X direction. The rail portion 11*e* includes a first rail 11*h* which is provided in the vicinity of the front end of the plug connector 10 in the X direction and a second rail 11*i* which is provided to the rear of the first rail 11*h* in the X direction. Both the first rail 11*h* and the second rail 11*i* are provided at both ends of the cover portion 11*g* in the Y direction. As shown in FIG. 7A, a position of a front end 11*x* of the first rail 11*h* in the X direction substantially matches a position of a front end 11*y* of a slit formed in the fitting portion 11*a* in the X direction. As shown in FIG. 7A, since the rail portion 11*e* (particularly, the first rail 11*h*) is covered (hidden) by a sliding portion 39 of the locking member 30 when moving the locking member 30 with respect to the plug connector 10, it is difficult to directly and visually recognize the position of the locking member 30 with respect to the rail portion 11*e*. In this regard, since a position of the front end 11*y* of the slit of the fitting portion 11*a* not covered by the sliding portion 39 substantially matches a position of the front end 11*x* of the first rail 11*h* of the rail portion 11*e* in the X direction, it is possible to indirectly recognize a position where a first protrusion portion 39*b* of the locking member 30 is located in the rail portion 11*e* by visually recognizing a position where the locking member 30 is located in the front end 11*y* of the slit of the fitting portion 11*a*. Further, as shown in FIG. 6B, the front end 11*y* of the slit of the fitting portion 11*a* is located at the front end of the fitting portion 11*a* in the X direction in relation to a portion (a portion contacting the pair of arm portions 37 and 38 at the regulation position) contacting the pair of arm portions 37 and 38 in the fitting portion 11*a*.

Figure 2A:
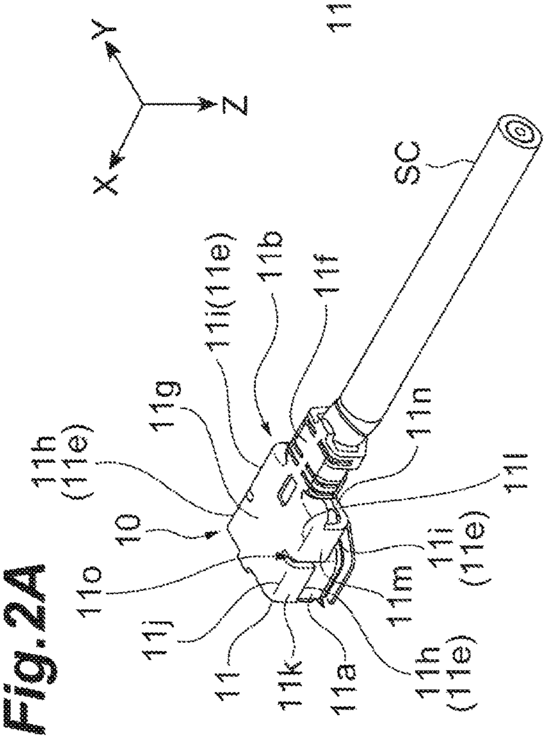
FIG. 2A is a perspective view showing a plug connector included in the electrical connector of FIG. 1.
Figure 2B:
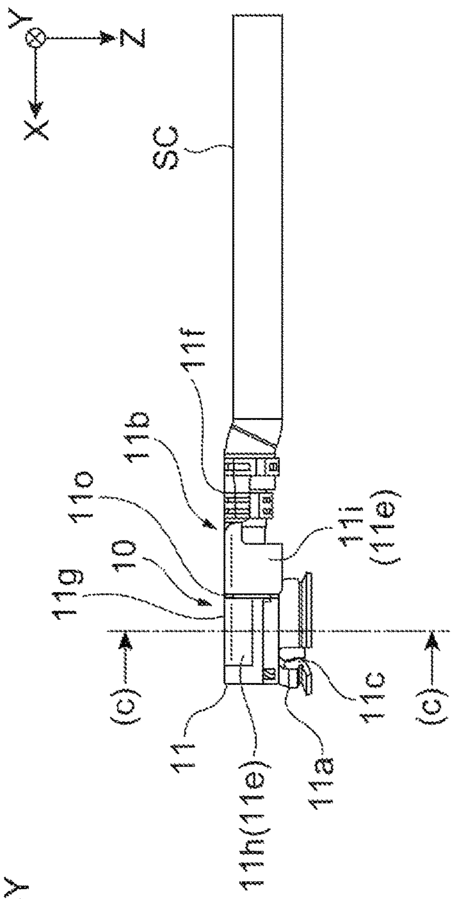
FIG. 2B is a side view.
Figure 2C:
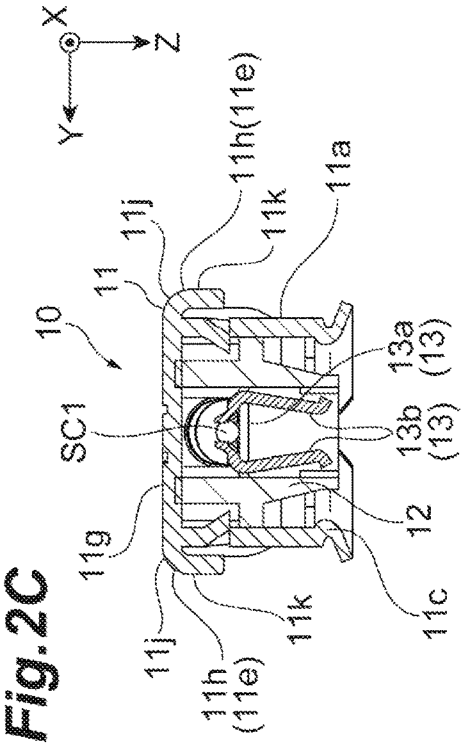
FIG. 2C is a cross-sectional view taken along a line (c)-(c) of FIG. 2B.
Figure 2D:
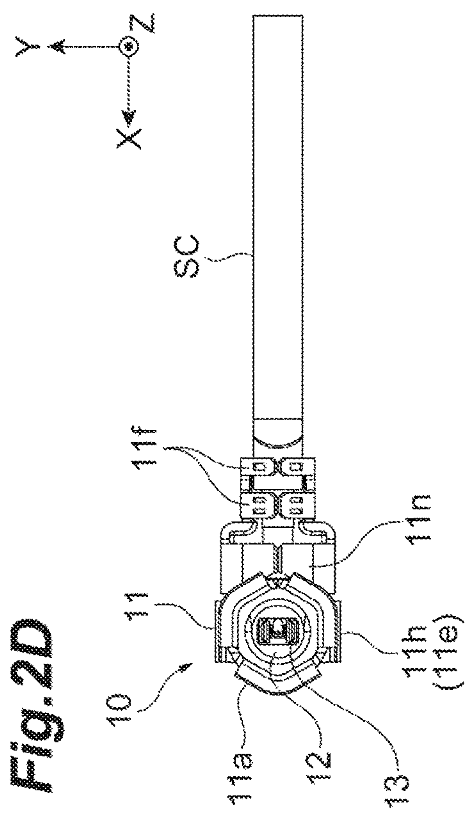
FIG. 2D is a bottom view.

As shown in FIG. 2A, the first rail 11*h* includes a first connection portion 11*j*, which is a connecting portion with respect to the cover portion 11*g*, and a first wall portion 11*k* which contiguously extends from the first connection portion 11*j* in the Z direction (the direction of engagement). The second rail 11*i* includes a second connection portion 11*l* which is a connecting portion with respect to the cover portion 11*g*. Additionally, the second rail 11*i* includes a second wall portion 11*m* which contiguously extends from the second connection portion 11*l* in the Z direction (the direction of engagement), and a cover portion 11*n* which is bent from the second wall portion 11*m* and covers the outer periphery of the outer conductor of the coaxial cable SC.

The first wall portion 11*k* and the second wall portion 11*m* contact the locking member 30 when the sliding portion 39 (to be described later) of the locking member 30 slides. The first wall portion 11*k* and the second wall portion 11*m* are not contiguous in the X direction and a notch portion 11*o* (e.g., an engagement portion) is formed therebetween. The notch portion 11*o* is located to the rear of the fitting portion 11*a* in the X direction. Both the first rail 11*h* and the second rail 11*i* are plate-shaped members integrally formed with the cover portion 11*g* and the first connection portion 11*j*. In some examples, the first wall portion 11*k*, the second connection portion 11*l*, the second wall portion 11*m*, and the cover portion 11*n* described above are formed by bending, for example, both end portions of the cover portion 11*g* in the Y direction.

(Insulation Housing)

The insulation housing 12 is formed in a cylindrical shape and is an insulator (see FIG. 2C) which holds the inner conductor contact 13 therein and insulates the outer conductor shell 11 and the inner conductor contact 13 from each other. The outer peripheral surface of the insulation housing 12 contacts the inner peripheral surface of the fitting portion 11*a*.

(Inner Conductor Contact)

The inner conductor contact 13 is attached to the insulation housing 12 by press-inserting. The inner conductor contact 13 includes a connection portion 13*a* connected to the inner conductor SC1 of the coaxial cable SC and a pair of contact portions 13*b* extending from the connection portion 13*a* in the Z direction (the direction of engagement) and electrically connected to the inner conductor SC1 (see FIG. 2C). The pair of contact portions 13*b* is configured to be elastically displaceable in the Z direction and contacts the signal contact member 102 (to be described later) of the receptacle connector 100.

[Locking Member]

Next, a detail of the locking member 30 will be described with reference to FIGS. 3A to 3D. The locking member 30 is attached to the plug connector 10. The locking member 30 is used to securely maintain the state of engagement between the plug connector 10 and the receptacle connector 100 by regulating or prohibiting an increase in the outer diameter of the fitting portion 11*a* of the plug connector 10 after the plug connector 10 and the receptacle connector 100 have been connected or fitted to each other. The locking member 30 includes a main body 31, a regulation portion 32, and a guide portion 33. The locking member 30 is formed by, for example, a thin plate-shaped metal member.

(Main Body)

The main body 31 includes a flat portion 34 and a connecting portion 35. The flat portion 34 is a substantially rectangular flat plate which is provided to cover the lid portion 11*b* of the outer conductor shell 11, more specifically, the cover portion 11*g* (see FIG. 1). The flat portion 34 faces the pair of arm portions 37 and 38 (to be described later) of the regulation portion 32 in the Z direction and is connected to the sliding portion 39 (to be described later) of the guide portion 33. The flat portion 34 is provided with an opening 34*a* penetrating the flat portion in the Z direction. The opening 34*a* is formed at a position where the pair of arm portions 37 and 38 may be visually recognized and is formed at the center of the front end of the flat portion 34. A convex portion 34*b* which protrudes upward from an outer surface of the flat portion 34 is provided to the rear of the opening 34*a* in the X direction. The convex portion 34*b* facilitates the ability to slide the locking member 30, such as by providing a raised surface which may be pushed or pulled. The connecting portion 35 extends in the Z direction to connect the front end of the flat portion 34 to the front end of the regulation portion 32.

(Regulation Portion)

The regulation portion 32 is configured to regulate or prohibit the enlargement of the fitting portion 11*a*. More specifically, the regulation portion 32 may be configured to regulate the enlargement of the fitting portion 11*a* in order to keep the state of engagement between the concave portion 103*a* of the ground contact member 103 and the projection portion 11*c* of the fitting portion 11*a* prior to removing the fitting portion 11*a* from the ground contact member 103 (see FIG. 1) of the receptacle connector 100. The regulation portion 32 faces the flat portion 34 in the Z direction and extends in the X direction in parallel to the flat portion 34. The regulation portion 32 includes a front end portion 36 which is contiguously located between the connecting portion 35 and a pair of arm portions 37 and 38 connected to the front end portion 36. The regulation portion 32 regulates the enlargement of the fitting portion 11*a* when the fitting portion 11*a* is located in an area (e.g., a surrounding area) defined by the front end portion 36 and the pair of arm portions 37 and 38.

The front end portion 36 may be configured to position the fitting portion 11*a* when the enlargement of the fitting portion 11*a* is regulated by contact between the locking member 30 and the front end of the fitting portion 11*a* in the X direction (e.g., when the locking member 30 is positioned at the regulation position to be described later with respect to the plug connector 10). The front end portion 36 comprises a shape generally corresponding to a partial cylindrical shape in order to increase the contact area with the cylindrical fitting portion 11*a*. That is, the front end portion 36 closest to a pair of extension portions 41 and 42, to be described later (see FIG. 3C), is widened in the Y direction.

The pair of arm portions 37 and 38 regulates or prohibits the enlargement of the fitting portion 11*a* by sandwiching the fitting portion 11*a* from the outside in the radial direction (the Y direction). A first arm portion 37 contiguously extends from one side of the front end portion 36 in the negative X direction, and a second arm portion 38 contiguously extends from the other side of the front end portion 36 parallel to the first arm portion 37 in the negative X direction. A gap between the pair of arm portions 37 and 38 is narrower than the outer diameter of the fitting portion 11*a* when it is enlarged, and the gap is set to be substantially the same as, for example, the outer diameter of the fitting portion 11*a* when it is not enlarged. In some example embodiments, the "outer diameter of the fitting portion 11*a*" means the outer diameter of the fitting portion 11*a* which is located at the same height as the pair of arm portions 37 and 38 (the same position in the Z direction) when the locking member 30 is attached to the plug connector 10.

The lengths of the pair of arm portions 37 and 38 in the X direction are set to be the same as each other. As shown in FIG. 6B, the lengths are set to a length in which the fitting portion 11*a* is substantially accommodated in an area (a surrounded area) defined by the front end portion 36 and the pair of arm portions 37 and 38 when the fitting portion 11*a* contacts the front end portion 36. The length of each of the pair of win portions 37 and 38 in the X direction may be set to any length as long as the length can regulate the enlargement of the fitting portion 11*a*. The pair of arm portions 37 and 38 is integrally formed with the pair of extension portions 41 and 42 (to be described later) of the guide portion 33.

(Guide Portion)

Figures 3A, 3B, 3C, 3D:
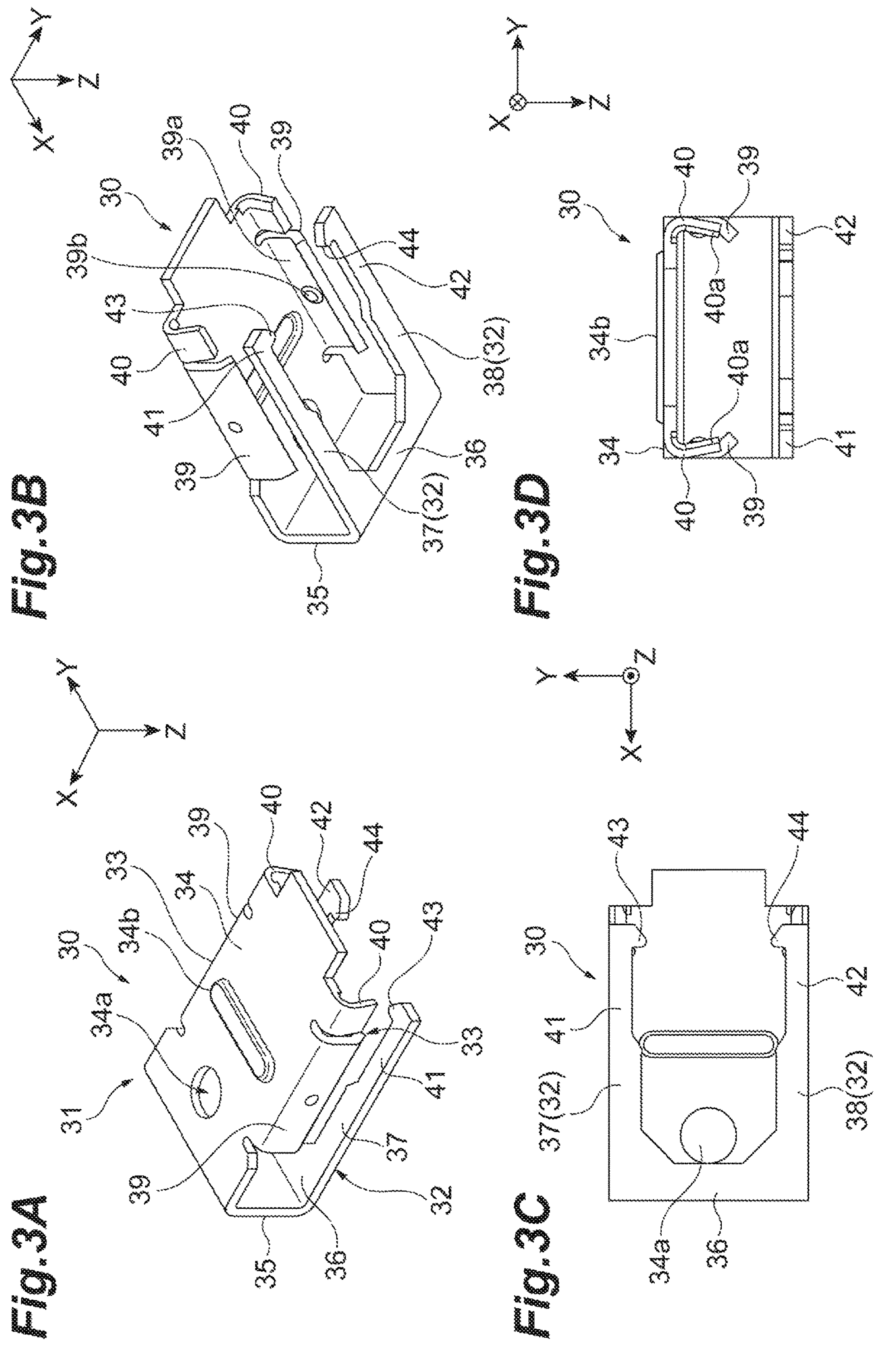
FIG. 3A is a perspective view showing a locking member included in the electrical connector of FIG. 1.
FIG. 3B is a perspective view from a direction different from FIG. 3A.
FIG. 3C is a bottom view.
FIG. 3D is a rear view.

As shown in FIG. 3A, the guide portion 33 may be configured to guide the movement of the regulation portion 32 with respect to the fitting portion 11*a*. In some examples, guiding the movement of the regulation portion 32 may be understood as both guiding the movement toward a certain area and securely maintaining a position of the regulation portion 32 in the certain area. The guide portion 33 guides the movement of the regulation portion 32 in the axial direction (the X direction) of the coaxial cable SC which is a direction intersecting the direction of engagement (the Z direction) of the fitting portion 11*a*. The guide portion 33 guides the regulation portion 32 so as to be movable between the regulation position (see FIG. 6B) where the enlargement of the fitting portion 11*a* is regulated and the standby position (see FIG. 5B) where the enlargement is not regulated. In this way, the regulation position and the standby position indicate a relative position of the regulation portion 32 with respect to the fitting portion 11*a*. The guide portion 33 includes the sliding portion 39, a positioning portion 40, and the pair of extension portions 41 and 42.

As shown in FIG. 3A, a pair of sliding portions 39 is integrally formed with the flat portion 34 and extends in the X direction at the approximate center portion of the flat portion 34. The pair of sliding portions 39 is provided at both sides of the flat portion 34 in the Y direction. The pair of sliding portions 39 extends from both sides of the flat portion 34 in the Z direction toward the pair of arm portions 37 and 38. The sliding portion 39 slides along the rail portion 11*e* while a contact surface 39*a* (see FIG. 4B) corresponding to an inner wall surface in the Y direction contacts the rail portion 11*e* so as to guide the movement of the regulation portion 32 in the X direction. The pair of sliding portions 39 slides along the pair of rail portions 11*e* while the pair of rail portions 11*e* and the cover portion 11*g* of the outer conductor shell 11 are accommodated in an area defined in part by the flat portion 34.

The sliding portion 39 includes a first protrusion portion 39*b* (see FIG. 3B) which is formed at the approximate center portion of the contact surface 39*a* in the X direction and protrudes toward the rail portion 11*e*. The position of the first protrusion portion 39*b* in the X direction substantially matches the position of a rear end of each of the pair of arm portions 37 and 38 in the X direction.

The positioning portion 40 corresponds to a pair of plate-shaped pieces which is integrally formed with the flat portion 34 at both sides of the flat portion 34 in the Y direction and is provided to the rear of the sliding portion 39 in the X direction. As shown in FIG. 3D, the positioning portion 40 extends downward at an angle so that the pair of plate-shaped pieces are located closer to each other at the lower end 40*a*. The lower end 40*a* is located to the inside of the inner wall surface of the sliding portion 39 in the Y direction at the corresponding height in the Z direction where the lower end 40*a* is provided.

The pair of extension portions 41 and 42 contiguously extends from the pair of arm portions 37 and 38 of the regulation portion 32. That is, a first extension portion 41 contiguously extends from the first arm portion 37 in the negative X direction and a second extension portion 42 contiguously extends from the second arm portion in the negative X direction. As shown in FIG. 5B, the pair of extension portions 41 and 42 may be configured to sandwich the fitting portion 11*a* from the outside in the radial direction when the regulation portion 32 is disposed at the standby position and a gap between the pair of extension portions 41 and 42 is wider than a gap between the pair of atm portions 37 and 38. The gap between the pair of extension portions 41 and 42 is wider than at least the outer diameter of the fitting portion 11*a* when the outer diameter of the fitting portion 11*a* has not been enlarged. Accordingly, the fitting portion 11*a* sandwiched between the pair of extension portions 41 and 42 from the outside in the radial direction can be enlarged.

As shown in FIG. 3C, the pair of extension portions 41 and 42 includes second protrusion portions 43 and 44 which are formed at the rear ends (the opposite end portions contiguous to the pair of arm portions 37 and 38 in the pair of extension portions 41 and 42) in the X direction to protrude in the opposite directions. The gap between the second protrusion portions 43 and 44 is smaller than the outer diameter of the fitting portion 11*a* when the outer diameter of the fitting portion 11*a* has not been enlarged. The second protrusion portions 43 and 44 protrude and are configured to contact the fitting portion 11*a* to prevent the fitting portion 11*a* from passing through the gap between the pair of extension portions 41 and 42 so that the locking member 30 is not unintentionally separated from the plug connector 10 in the X direction.

[Detail of Electrical Connector]

Figure 4A:
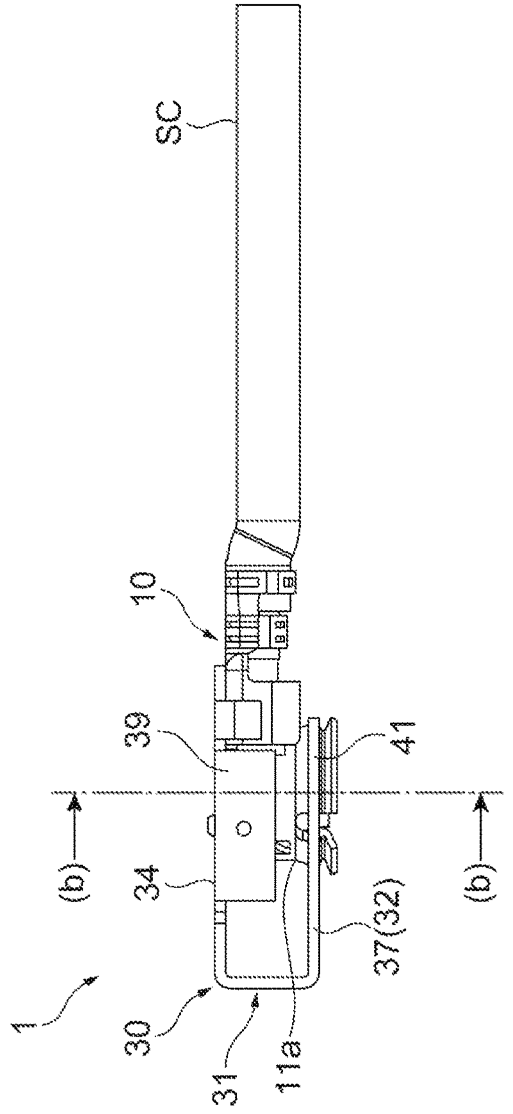
FIG. 4A is a side view showing the electrical connector of FIG. 1
Figure 4B:
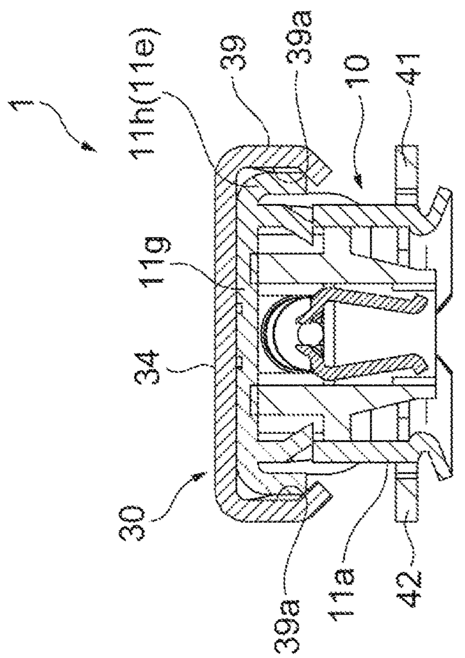
FIG. 4B is a cross-sectional view taken along a line (b)-(b) of FIG. 4A.

Next, additional details of the electrical connector 1 including the plug connector 10 to which the locking member 30 is attached will be described with reference to FIGS. 4 to 9. FIGS. 4A and 4B show a state of operation where the regulation portion 32 is located at the standby position (see FIG. 5B) and where the enlargement of the fitting portion 11*a* is not being regulated. As shown in FIGS. 4A and 4B, the flat portion 34 of the main body 31 contacts the cover portion 11g to cover the cover portion 11g of the outer conductor shell 11 when the locking member 30 is attached to the plug connector 10. Further, the contact surface 39*a* slides along the rail portion 11*e* while contacting the rail portion 11*e*. Since the regulation portion 32 is located at the standby position, the pair of extension portions 41 and 42 is disposed to sandwich the fitting portion 11*a* from the outside in the radial direction.

Figure 5A:
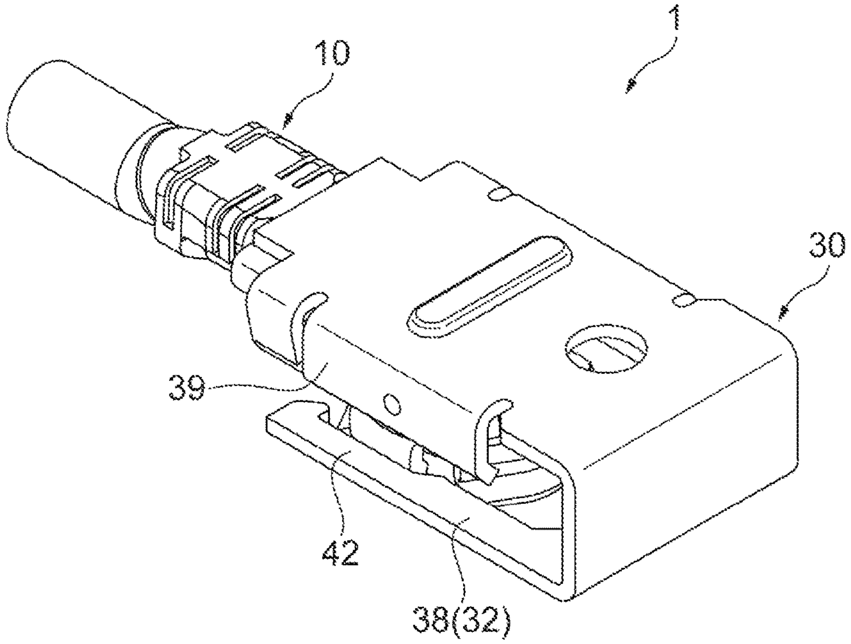
FIG. 5A is a perspective view showing the electrical connector of which a locking member is located at a standby position and FIG. 5B is a bottom view.
Figure 5B:
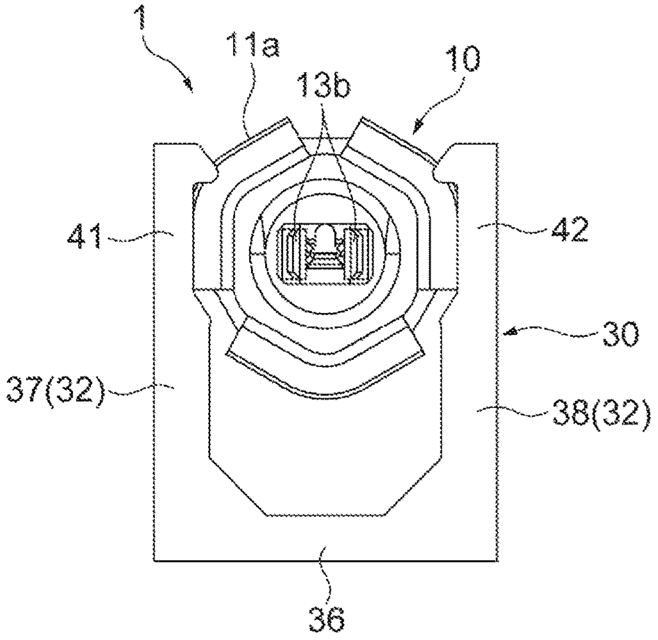

As shown in FIGS. 5A and 5B, when the regulation portion 32 is located at the standby position, the fitting portion 11*a* is disposed between the pair of extension portions 41 and 42 instead of between the pair of arm portions 37 and 38. At the standby position, the fitting portion 11*a* can be enlarged. The electrical connector 1 is fitted to the receptacle connector 100 while the fitting portion 11*a* is enlarged at the standby position (additional details will be described later). In the standby state, the sliding portion 39 slides while contacting the first rail 11*h* (see FIG. 2A) of the rail portion 11*e*.

Figure 6A:
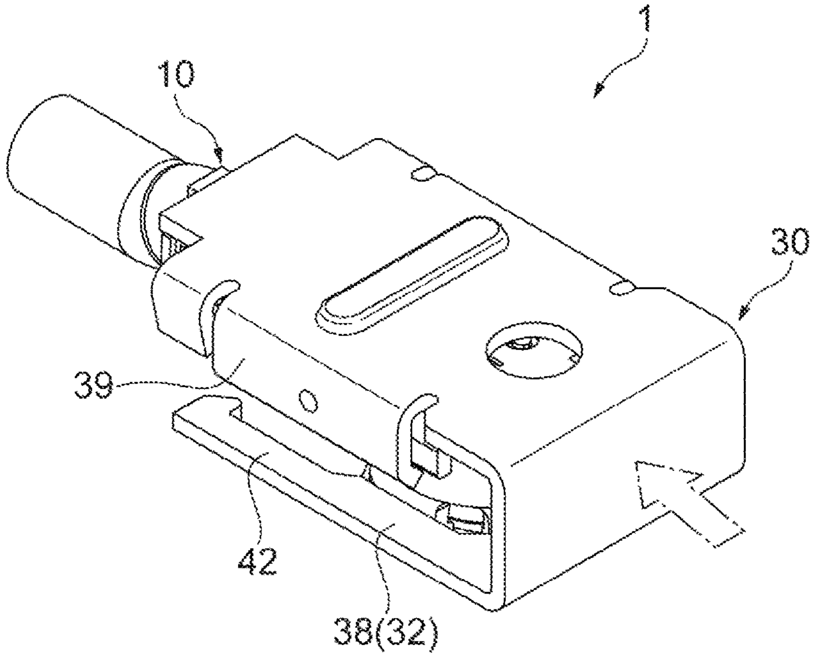
FIG. 6A is a perspective view showing the electrical connector of which the locking member is located at a regulation position and FIG. 6B is a bottom view.
Figure 6B:
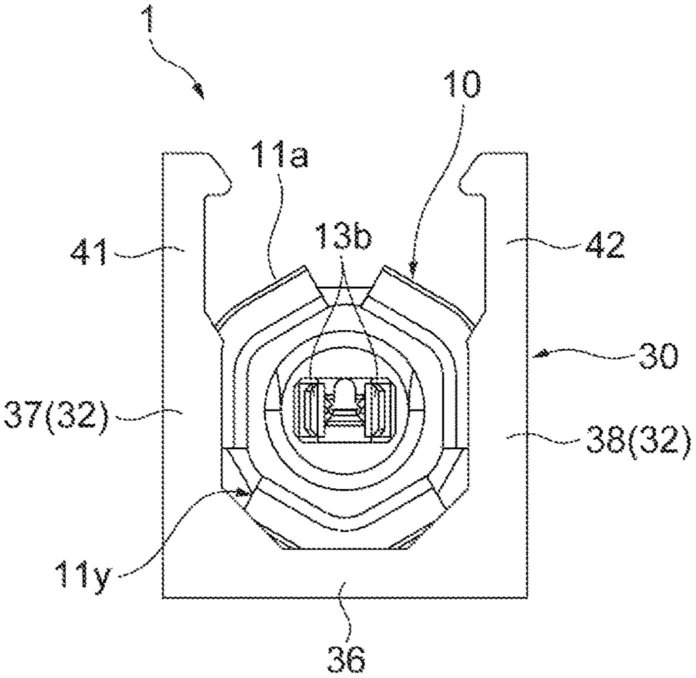
Figure 7A:
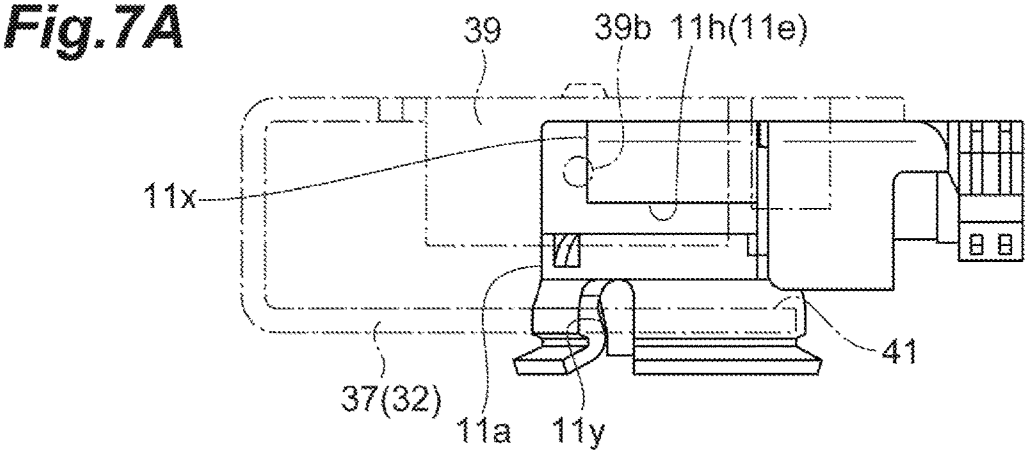
FIG. 7A is a side view illustrating a configuration for detecting a position by an operator.
Figure 7B:
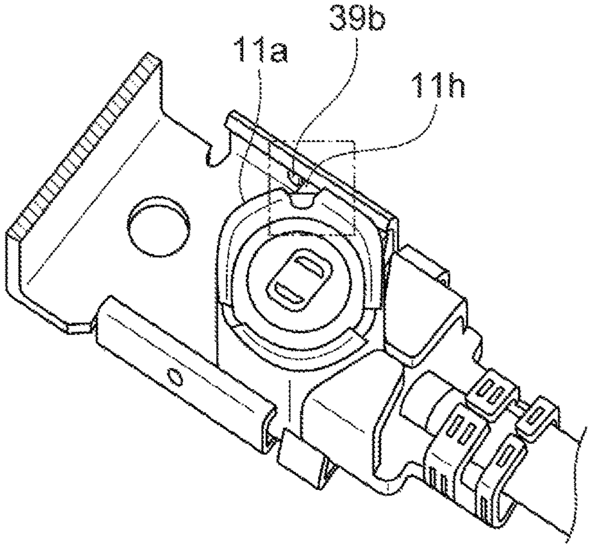
FIG. 7B is a perspective view showing a state where a part of the locking member is cut.
Figure 7C:
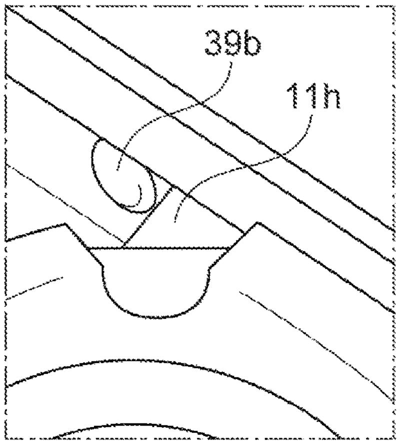
FIG. 7C is a partially enlarged view of FIG. 7B.

Meanwhile, as shown in FIGS. 6A and 6B, when the regulation portion 32 is located at the regulation position, the fitting portion 11*a* is disposed between the pair of arm portions 37 and 38. At the regulation position, the fitting portion 11*a* cannot be enlarged by the pair of arm portions 37 and 38. In the regulation position, the outer diameter of the fitting portion 11*a* is not increased and thus the state of engagement with respect to the receptacle connector 100 is securely maintained (additional details will be described later). In the regulation state, the sliding portion 39 contacts both the first rail 11*h* and the second rail 11*i* (see FIG. 2A) of the rail portion 11*e*.

Next, a configuration for detecting the regulation position or the standby position by the operator will be described in detail. For example, as shown in FIG. 7A, when the locking member 30 is slid from the regulation positon to the standby position, the first protrusion portion 39*b* does not contact the first rail 11*h* at a certain timing (see FIGS. 7B and 7C). When the first protrusion portion 39*b* slides between a contact state and a non-contact state, the resistance between adjacent members changes. Accordingly, the operator can detect a change in the resistances corresponding to the regulation position and the standby position.

Then, as described above, a position of the first protrusion portion 39*b* substantially matches each position of the rear ends of the pair of arm portions 37 and 38 in the X direction, and a position of the front end 11*x* of the first rail 11*h* substantially matches a position of the front end 11*y* of the slit formed in the fitting portion 11*a* in the X direction. Furthermore, as shown in FIG. 6B, the front end 11*y* of the slit is located at the front end of the fitting portion 11*a* proximate to the front end portion 36. For this reason, when a change in sensation when sliding is detected by the operator (e.g., a time at which the first protrusion portion 39*b* does not contact the first rail 11*h*), the rear ends of the pair of arm portions 37 and 38 reach the front end 11*y* of the slit and the enlargement of the fitting portion 11*a* is not regulated by the pair of arm portions 37 and 38. That is, the regulation portion has already moved from the regulation position to the standby position at the time at which the operator detects the change in resistance. With the above-described configuration, the operator can detect the standby position by the first protrusion portion 39*b*.

Figure 8A:
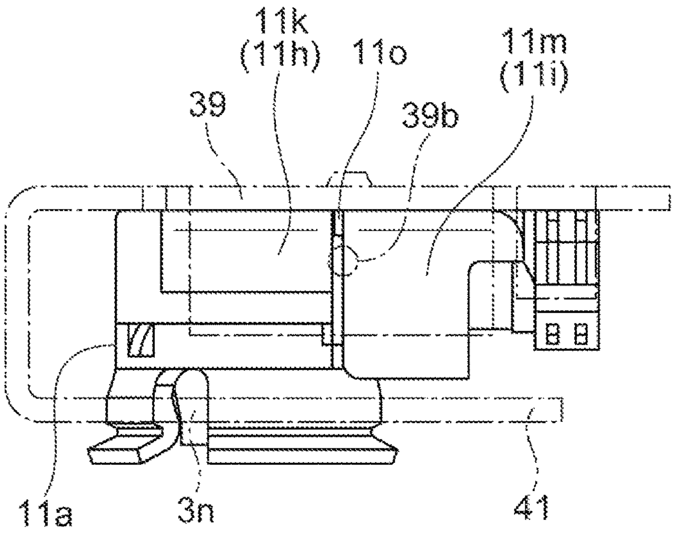
FIG. 8A is a side view illustrating a configuration for detecting a position by an operator.
Figure 8B:
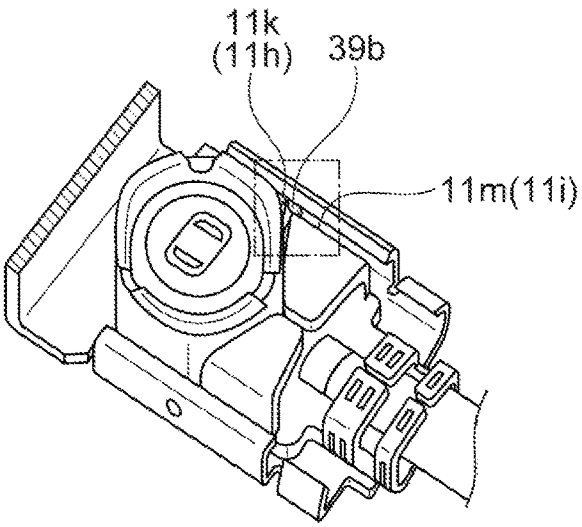
FIG. 8B is a perspective view showing a state where a part of the locking member is cut.
Figure 8C:
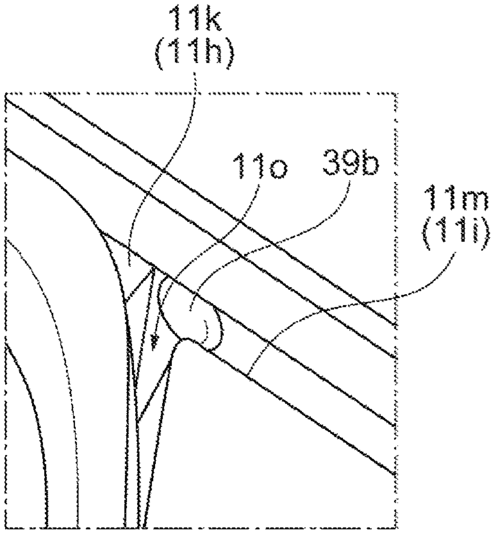
FIG. 8C is a partially enlarged view of FIG. 8B.

Further, for example, as shown in FIG. 8A, when the sliding portion 39 of the locking member 30 is slid toward the regulation position, the first protrusion portion 39*b* contacting the first wall portion 11*k* of the first rail 11*h* reaches the notch portion 11*o* between the first wall portion 11*k* and the second wall portion 11*m* at a certain timing (see FIGS. 8B and 8C). When the first protrusion portion 39*b* reaches the notch portion 110, the first protrusion portion 39*b* is accommodated (depressed) in the notch portion 110. Accordingly, the operator can feel a sensation of clicking and thus the operator can detect a change in the state of engagement.

Then, as described above, the position of the first protrusion portions 39*b* substantially matches the corresponding positions of the rear ends of the pair of arm portions 37 and 38 in the X direction and, as shown in FIG. 8A, a position of the notch portion 110 in the X direction substantially matches a position of the rear end of the fitting portion 11*a* in the X direction. For this reason, when the operator detects that the first protrusion portion 39*b* engages with the notch portion 110, the fitting portion 11*a* is located between the pair of arm portions 37 and 38 and the regulation portion 32 is located at the regulation position. With the above-described configuration, it is possible to detect the regulation position by the operator using the first protrusion portion 39*b*.

Figure 9A:
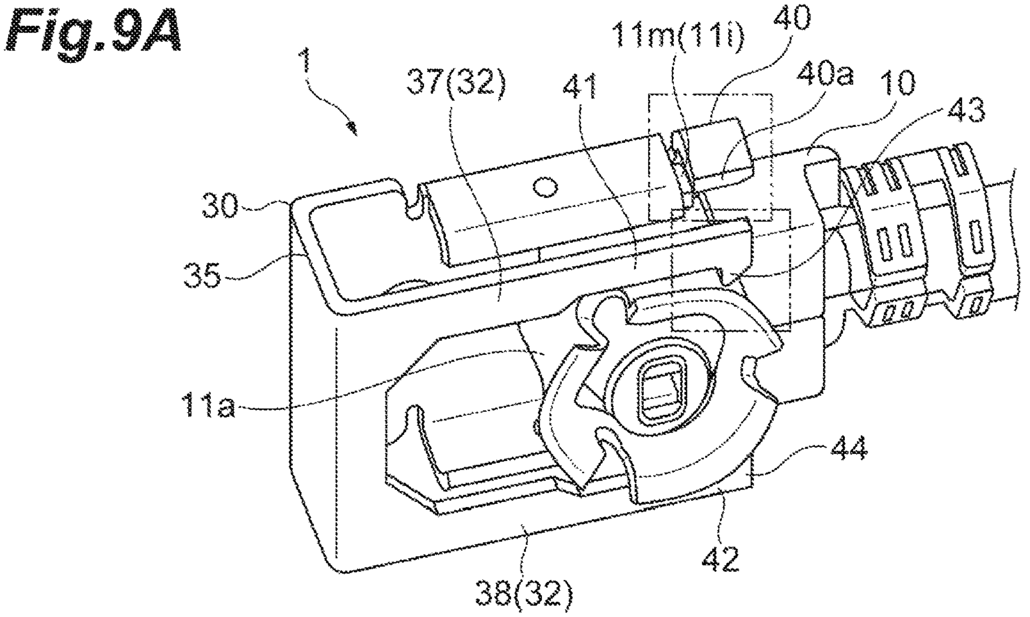
FIG. 9A is a perspective view showing a separation preventing structure of the electrical connector and FIGS. 9B and 9C are partially enlarged views of FIG. 9A.

Next, a separation preventing structure configured to prevent the separation of the electrical connector 1 will be described in further detail. Specifically, the separation preventing structure may be configured to prevent the separation of the locking member 30 from the plug connector 10. As shown in FIG. 9A, when the regulation portion 32 is located at the standby position, the separation preventing structure may be configured to prevent the locking member 30 from being separated from the plug connector 10 when the connecting portion 35 of the locking member 30 is further moved in a direction away from the front end of the fitting portion 11*a* of the plug connector 10. In this regard, in the electrical connector 1, the locking member 30 is provided with the positioning portion 40 and the second protrusion portions 43 and 44 as the separation preventing structure for preventing the separation of the locking member 30.

Figure 9B:
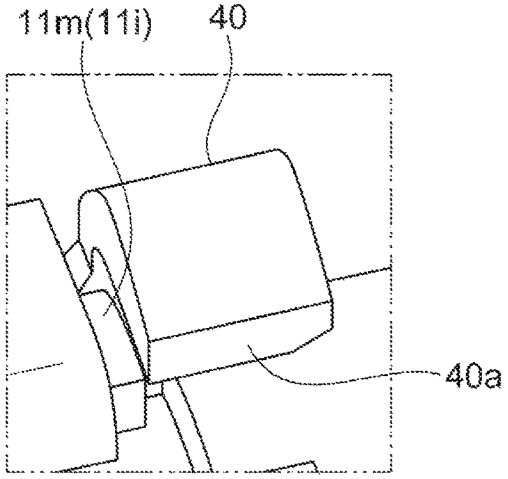

As shown in FIGS. 9A and 9B, the positioning portion 40 contacts the second wall portion 11*m* of the second rail 11*i* so that the movement of the second wall portion 11*m* beyond the positioning portion 40 is prevented. As shown in FIG. 3D, a pair of positioning portions 40 extends from the flat portion 34 at an angle so that the lower ends 40*a* are closer to each other. That is, the lower ends 40*a* of the positioning portions 40 protrude in a direction in which both ends approach each other in the Y direction. The lower ends 40*a* protrude in the Y direction to a degree in which the lower ends 40*a* may be configured to contact the rear end of the second wall portion 11*m* in the X direction and prevent the passage of the second wall portion 11*m*. Accordingly, it is possible to prevent the locking member 30 from being separated from the plug connector 10.

Figure 9C:
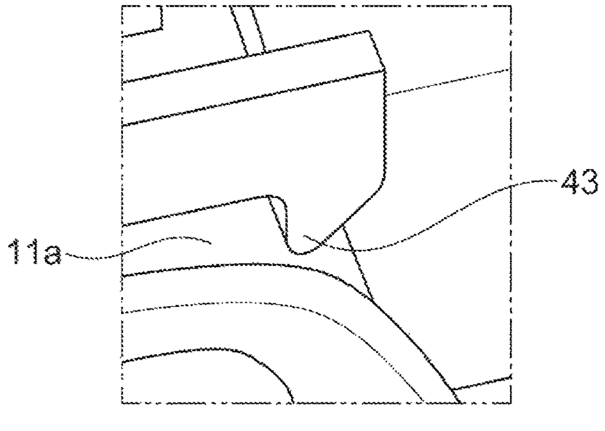

As shown in FIGS. 9A and 9C, the second protrusion portions 43 and 44 contact the fitting portion 11*a* to prevent the passage of the fitting portion 11*a* between the pair of extension portions 41 and 42. As shown in FIG. 3C, the second protrusion portions 43 and 44 face each other in the Y direction. Then, a gap between the second protrusion portions 43 and 44 is smaller than the outer diameter of the fitting portion 11*a*, even when the fitting portion 11*a* is not enlarged. Accordingly, the fitting portion 11*a* may be prevented from passing between the pair of extension portions 41 and 42, and the separation of the locking member 30 from the plug connector 10 may be prevented.

[Fitting and Locking of Electrical Connector]

Next, the connection and removal of the plug connector 10 and the receptacle connector 100 will be described with reference to FIGS. 1, 10, and 11.

The receptacle connector 100 includes, as shown in FIG. 1, a housing 101, the signal contact member 102, and the ground contact member 103. The receptacle connector 100 is mounted on the printed wiring board 200 by, for example, soldering or the like. The receptacle connector 100 is fitted to the plug connector 10 attached to the coaxial cable SC. The signal contact member 102 is a signal transmission conductor formed by, for example, a thin plate-shaped metal member. The signal contact member 102 is accommodated in the housing so that at least a part protrudes outward from an opening of the housing. The signal contact member 102 contacts the inner conductor contact 13 of the plug connector 10 to be electrically connected to the inner conductor SC1. The ground contact member 103 is a member which constitutes a part of the ground circuit while being connected to the ground terminal 202 of the printed wiring board 200 formed by, for example, a thin plate-shaped metal member. The ground contact member 103 is disposed to surround the outside of the signal contact member 102 and the housing in an annular shape. An outer peripheral surface of the ground contact member 103 is provided with the concave portion 103*a* (see FIG. 10C) which is depressed inward in the radial direction along the entire circumference thereof. The concave portion 103*a* corresponds to a connection position with respect to the projection portion 11*c* formed at the fitting portion 11*a* of the plug connector 10.

Figure 10A:
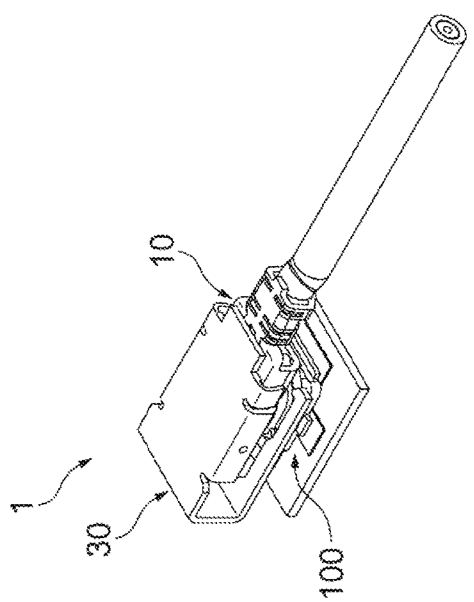
FIG. 10A is a perspective view showing the electrical connector when the electrical connector is fitted to a receptacle connector.
Figure 10B:
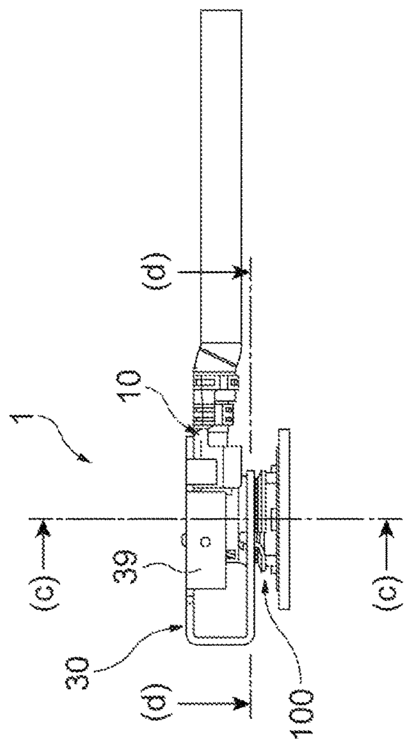
FIG. 10B is a side view.
Figure 10C:
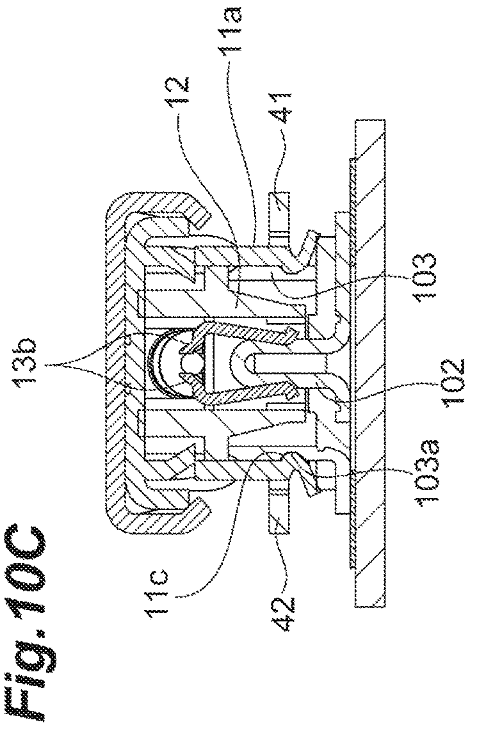
FIG. 10C is a cross-sectional view taken along a line (c)-(c) of FIG. 10B.
Figure 10D:
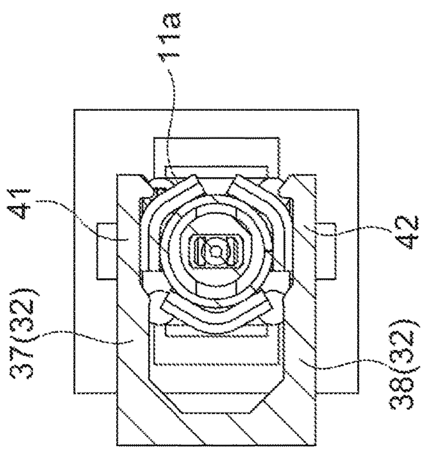
FIG. 10D is a cross-sectional view taken along a line (d)-(d) of FIG. 10B.

The regulation portion 32 is located at the standby position as shown in FIG. 10D when the plug connector 10 and the receptacle connector 100 are fitted to each other. In this case, the fitting portion 11*a* is disposed between the pair of extension portions 41 and 42. When the fitting portion 11*a* is enlarged, the plug connector 10 is fitted to the receptacle connector 100. Specifically, as shown in FIG. 10C, the ground contact member 103 of the receptacle connector 100 is inserted between the enlarged fitting portion 11*a* and the insulation housing 12.

In the connecting operation, the projection portion 11*c* of the fitting portion 11*a* engages with the concave portion 103*a* of the ground contact member 103 and the plug connector 10 is fitted to the receptacle connector 100. In the state of engagement, the pair of contact portions 13*b* of the plug connector 10 contacts the signal contact member 102 of the receptacle connector 100. In addition, the fitting portion 11*a* is made to be insertable onto and removable from the ground contact member 103 when the fitting portion is enlarged and is not made to be insertable onto and removable from the ground contact member 103 when the fitting portion is not enlarged.

Figure 11A:
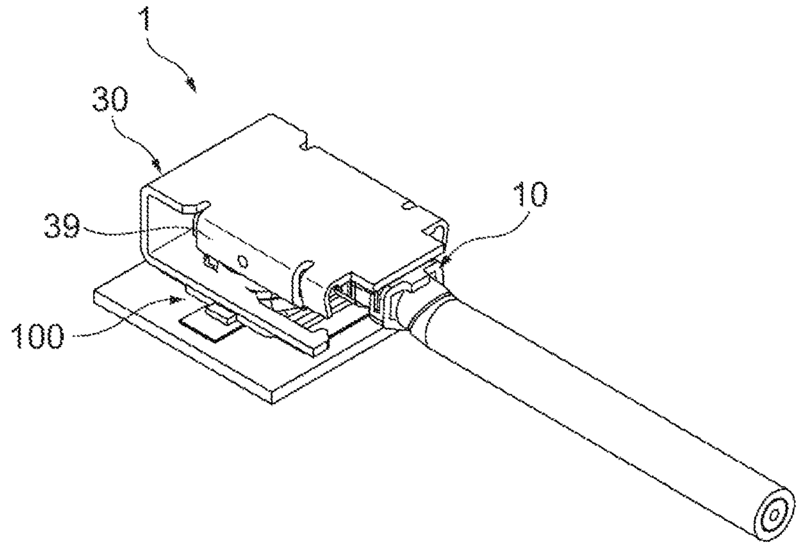
FIG. 11A is a perspective view showing the electrical connector after the electrical connector is fitted to the receptacle connector.
Figure 11B:
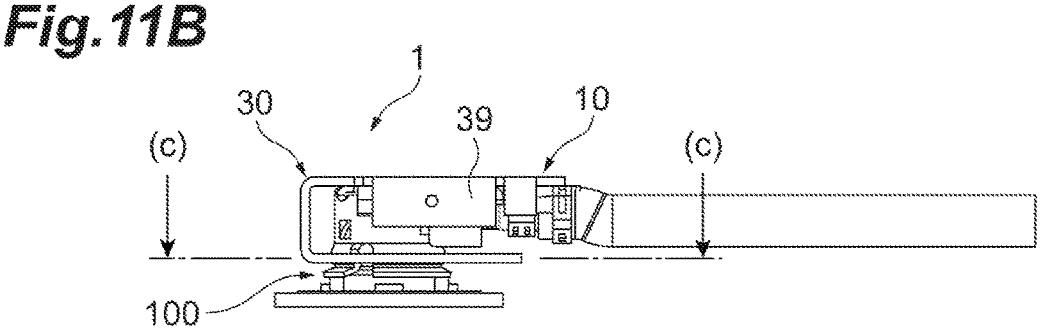
FIG. 11B is a side view.
Figure 11C:
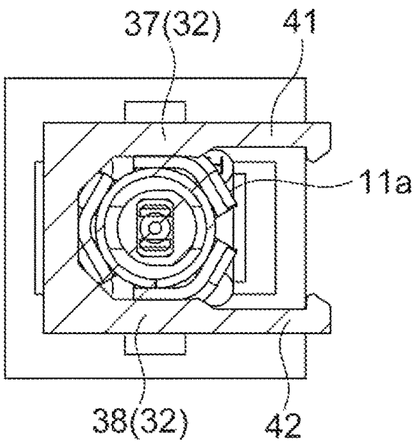
FIG. 11C is a cross-sectional view taken along a line (c)-(c) of FIG. 11B.

As shown in FIGS. 11A and 11B, when securely maintaining (locking) the state of engagement after the fitting, the sliding portion 39 of the locking member 30 is slid along the rail portion 11*e* and the regulation portion 32 is located at the regulation position as shown in FIG. 11C. In this case, the fitting portion 11*a* is disposed between the pair of arm portions 37 and 38 so as not to be enlarged. As described above for some example connectors, the fitting portion 11*a* cannot be attached to and removed from the ground contact member 103 in a state where the fitting portion is not enlarged. For this reason, when the fitting portion 11*a* is no longer enlarged after being attached to the ground contact member 103, the removal of the fitting portion 11*a* is not allowed and thus the state of engagement between the plug connector 10 and the receptacle connector 100 can be securely maintained.

[Operation and Effect]

Next, the operation and effect of the electrical connector 1 will be described.

The electrical connector 1 according to some example embodiments includes the plug connector 10 and the locking member 30 attached to the plug connector 10. The plug connector 10 includes the conductive outer conductor shell 11 which is electrically connected to the ground contact member 103 of the receptacle connector 100 which is the mating connector. The outer conductor shell 11 includes the cylindrical fitting portion 11*a* fitted to the ground contact member 103. An outer diameter of the fitting portion 11*a* is configured to be enlarged when the fitting portion is attached to or removed from the ground contact member 103. The locking member 30 includes the regulation portion 32 capable of regulating the enlargement of the fitting portion 11*a* at the time of removing the fitting portion 11*a* fitted to the ground contact member 103 (see FIG. 1) of the receptacle connector 100 and the guide portion 33 guiding the movement of the regulation portion 32 with respect to the fitting portion 11*a*. The guide portion 33 guides the regulation portion 32 as it moves between the regulation position where the enlargement of the fitting portion 11*a* is regulated and the standby position where the enlargement of the fitting portion is not regulated.

In the electrical connector 1, the regulation portion 32 of the locking member 30 is configured to regulate or prohibit an increase in outer diameter of the fitting portion 11*a*. Accordingly, since the enlargement of the fitting portion 11*a* fitted to the receptacle connector 100 is suppressed, it is possible to securely maintain the state of engagement between the plug connector 10 and the receptacle connector 100. Further, in the electrical connector 1, the guide portion 33 of the locking member 30 guides the regulation portion 32 as it moves between the regulation position where the enlargement of the fitting portion 11*a* is regulated and the standby position where the fitting portion is not regulated. Accordingly, for example, it is possible to easily perform the insertion and removal of the fitting portion in a state where the regulation portion 32 is located at the standby position with respect to the plug connector 10 at the time of inserting and removing the fitting portion 11*a* onto and from the ground contact member 103 and to securely maintain the state of engagement in a state where the regulation portion 32 is located at the regulation position with respect to the plug connector 10 at the time of fitting the fitting portion 11*a* of the plug connector 10 to the ground contact member 103 of the receptacle connector 100. That is, it is possible to securely maintain the state of engagement between the plug connector 10 and the receptacle connector 100 while also maintaining the functionality of the electrical connector, such as connecting and removing the plug connector 10.

The regulation portion 32 includes the pair of arm portions 37 and 38 which regulates the enlargement of the fitting portion 11*a* by sandwiching the fitting portion 11*a* from the outside in the radial direction. Since the fitting portion 11*a* is sandwiched from the outside in the radial direction which is a direction in which the diameter of the fitting portion 11*a* is widened, the enlargement of the fitting portion 11*a* can be effectively regulated. That is, it is possible to further securely maintain the state of engagement between the plug connector 10 and the receptacle connector 100.

A gap between the pair of arm portions 37 and 38 is narrower than the outer diameter of the fitting portion 11*a* which is enlarged. Accordingly, it is possible to simply and easily regulate the enlargement of the fitting portion 11*a* by sandwiching the fitting portion 11*a* between the pair of arm portions 37 and 38. In addition, since the force generated when the fitting portion 11*a* is enlarged is not great enough to bend or expand the relatively rigid pair of arm portions 37 and 38, it is possible to further reliably regulate or prohibit the enlargement of the fitting portion 11*a*.

The guide portion 33 guides the movement of the regulation portion 32 in a direction intersecting (e.g., perpendicular to) the direction of engagement of the fitting portion 11*a*. Since the movement of the regulation portion 32 is guided in a direction different from the direction of engagement, it is possible to clearly distinguish the fitting/connecting operation and the locking operation as different operations and thus to improve the functionality.

The plug connector 10 is attached to one end of the coaxial cable SC and the guide portion 33 guides the movement of the regulation portion 32 in the axial direction (the X direction) of the coaxial cable SC. Since the movement of the regulation portion 32 is guided in the axial direction (the X direction) of the coaxial cable SC, the coaxial cable SC does not inhibit the movement of the regulation portion 32 and the regulation portion 32 can be easily moved. Accordingly, the functionality can be improved.

The plug connector 10 includes the 11*d* portion 11*b* which covers a surface opposite to a surface facing the ground contact member 103 of the receptacle connector 100 of the fitting portion 11*a* in the Z direction. Additionally, the plug connector 10 includes the rail portion 11*e* which is provided in the lid portion 11*b* and extends in the axial direction (the X direction). The guide portion 33 may include the sliding portion 39 which extends in the axial direction (the X direction) and slides along the rail portion 11*e* to guide the movement of the regulation portion 32 in the axial direction (the X direction). Since the sliding portion 39 moves along the rail portion 11*e* of the plug connector 10, it is possible to simply and easily move the regulation portion 32 with respect to the fitting portion 11*a*.

The sliding portion 39 may include the first protrusion portion 39*b* which protrudes toward the rail portion 11*e*, and the rail portion 11*e* may include the notch portion 11*o* which engages with the first protrusion portion 39*b* after a position of the regulation portion 32 reaches the regulation position by the sliding of the sliding portion 39. Since the first protrusion portion 39*b* engages with the notch portion 11*o*, the operator can feel a sensation of clicking and thus the operator can detect when the regulation portion 32 becomes engaged in the regulation position.

The guide portion 33 may be configured to face the pair of arm portions 37 and 38 in the direction of engagement and to hold the sliding portion 39. Additionally, the guide portion 33 may include the flat portion 34 which is configured to cover the lid portion 11*b* and which may be provided with the opening 34*a*. Accordingly, since it is possible to visually recognize the positions of the pair of arm portions 37 and 38 with respect to the plug connector 10 from the opening 34*a* when sliding the sliding portion 39, the operator can detect the positions of the pair of arm portions 37 and 38.

The guide portion 33 may include the pair of extension portions 41 and 42 which contiguously extend from the pair of arm portions 37 and 38 of the regulation portion 32. The pair of extension portions 41 and 42 may be disposed to sandwich the fitting portion 11*a* from the outside in the radial direction while the regulation portion 32 is disposed at the standby position. A gap between the pair of extension portions 41 and 42 may be wider than a gap between the pair of arm portions 37 and 38. Since the extension portions 41 and 42 are configured to sandwich the fitting portion 11*a* when the regulation portion 32 is located at the standby position, it is possible to further appropriately guide the movement of the arm portions 37 and 38 (the regulation portion 32) with respect to the fitting portion 11*a*. Further, since a gap between the pair of extension portions 41 and 42 is wider than a gap between the pair of arm portions 37 and 38, the enlargement of the fitting portion 11*a* can be allowed when the regulation portion 32 is disposed at the standby position, that is, a state where the extension portions 41 and 42 sandwich the fitting portion 11*a*.

At least one of the pair of extension portions 41 and 42 may include the second protrusion portions 43 and 44 protruding toward the other side, and the second protrusion portions 43 and 44 may be provided at an opposite end of the extension portions 41 and 42 from the arm portions 37 and 38. The second protrusion portions 43 and 44 may protrude to prevent the passage of the fitting portion 11*a* between the pair of extension portions 41 and 42 as a result of contact with the fitting portion 11*a*. Since the second protrusion portions 43 and 44 are provided at the ends of the extension portions 41 and 42 and the second protrusion portions 43 and 44 protrude to prevent the passage of the fitting portion 11*a*, it is possible to prevent the locking member 30 from being separated from the plug connector 10.

MODIFIED EXAMPLES

While examples according to a first group of embodiments have been described, various modifications of the above-described embodiments can be made without departing from the spirit of the present disclosure. For example, although it has been described that a gap between the pair of extension portions 41 and 42 is wider than a gap between the pair of arm portions 37 and 38 to allow the enlargement of the fitting portion 11*a* at the standby position, the present disclosure is not limited thereto. For example, the enlargement of the fitting portion 11*a* may be allowed by setting the rigidity of the pair of extension portions 41 and 42 to be lower than the rigidity of the pair of arm portions 37 and 38.

Further, although it has been described that the sliding portion 39 includes the first protrusion portion 39*b* and the rail portion 11*e* includes the notch portion 11*o*, the present disclosure is not limited thereto. In contrast, the rail portion 11*e* may include one or more protrusion portions and the sliding portion 39 may include a notch portion which engages with the protrusion portion of the rail portion 11*e* in the regulation position.

Further, although it has been described that the second protrusion portions 43 and 44 are respectively provided at the pair of extension portions 41 and 42, the present disclosure is not limited thereto. For example, at least one of the pair of extension portions 41 and 42 may be provided with a configuration corresponding to the second protrusion portion.

Second Group of Example Embodiments

In the description below, a repetitive description will be omitted by using the same reference numerals for the same components or components having the same function.

[Outline of Electrical Connector]

Figure 12:
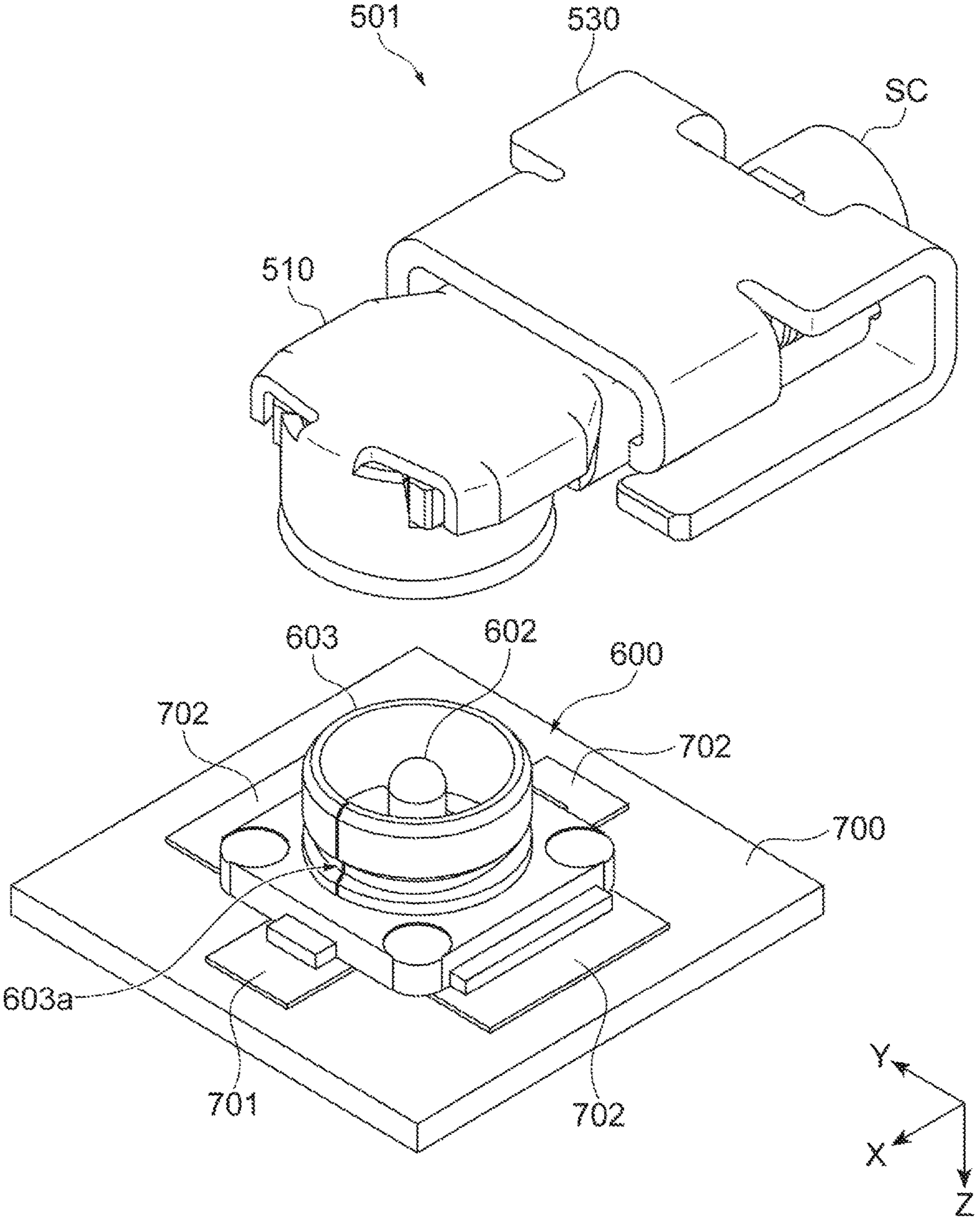
FIG. 12 is a perspective view of an electrical connector according to a second group of example embodiments of the present disclosure.

An outline of an example electrical connector will be described with reference to FIG. 12. As shown in FIG. 12, an electrical connector 501 includes a plug connector 510 (a first connector) and a locking member 530. The electrical connector 501 may be configured to electrically connect a cable-shaped signal transmission medium to an electric circuit of a substrate and is, for example, a RF (Radio Frequency) connector. The signal transmission medium may be configured to transmit signals of various electronic devices such as a cellular phone and is, for example, a coaxial cable SC. The substrate is, for example, a printed wiring board 700. That is, the electrical connector 501 of some example embodiments is a coaxial electrical connector which electrically connects the coaxial cable SC to an electric circuit of the printed wiring board 700. In the electrical connector 501, when a plug connector 510 attached to a terminal portion of the coaxial cable SC is fitted to a receptacle connector 600 mounted on the printed wiring board 700, the coaxial cable SC and the electric circuit of the printed wiring board 700 are electrically connected to each other.

Additionally, in some example embodiments the axial direction of the coaxial cable SC is understood as being in an "X direction", the direction of engagement between the plug connector 510 and the receptacle connector 600 when the plug connector 510 and the receptacle connector 600 are fitted to each other is a "Z direction", and a direction orthogonal to the X direction and the Z direction is a "Y direction". Further, in some example embodiments, an attachment end portion of the plug connector 510 in the coaxial cable SC in the X direction may be considered a "front end (a distal end)" and an opposite end portion may be considered a "base end (a rear end)". Further, the "top" of the plug connector 510 which is visible in FIG. 12 may be understood as being on an opposite side from the "bottom" of the plug connector 510 which faces the receptacle connector 600 in the Z direction.

[Plug Connector]

Next, further details of the plug connector 510 will be described with reference to FIGS. 13A to 13D. The plug connector 510 may be attached to one end (e.g., the front end) of the coaxial cable SC. As shown in FIG. 13A to FIG. 13D, the plug connector 510 includes an outer conductor shell 511 (e.g., a first contact) having a conductive property, an insulation housing 512 having an insulation property, and an inner conductor contact 513. Hereinafter, the coaxial cable SC to which the plug connector 510 is attached will be described in detail together with the outer conductor shell 511, the insulation housing 512, and the inner conductor contact 513 constituting the plug connector 510.

(Coaxial Cable)

The coaxial cable SC may comprise a wire which is used in a small terminal such as a cellular phone in order to transmit a high-frequency signal among various signal processing elements (for example, an antenna, a control chip for controlling the antennal, a substrate, and the like) built-in the small terminal. The coaxial cable SC includes an inner conductor, an insulator which is provided in the periphery of the inner conductor, an outer conductor which is provided in the periphery of the insulator, and a protection coating which is provided in the periphery of the outer conductor. In the coaxial cable SC, the outer conductor, the insulator, and the inner conductor are exposed stepwise in this order as it goes toward the front end to which the plug connector 510 is attached.

In some example embodiments, the inner conductor is electrically connected to a signal contact member 602 (see FIG. 12) of the receptacle connector 600 connected to a signal terminal 701 of the printed wiring board 700 through the inner conductor contact 513, thereby obtaining a signal transmission circuit. Further, the outer conductor of the coaxial cable SC is electrically connected to a ground contact member 603 (see FIG. 12) of the receptacle connector 600 connected to a ground terminal 702 of the printed wiring board 700 through the outer conductor shell 511, thereby obtaining a ground circuit.

(Outer Conductor Shell)

The outer conductor shell 511 may comprise a conductive ground contact member electrically connected to the outer conductor of the coaxial cable SC. The outer conductor shell 511 is provided to cover the periphery of the insulation housing 512 as shown in FIG. 13D. The outer conductor shell 511 is electrically connected to the ground contact member 603 (e.g., a second contact, see FIG. 12) of the receptacle connector 600 (e.g., the second connector) which is a mating connector, thereby obtaining a ground circuit. The outer conductor shell 511 is formed by, for example, a thin plate-shaped metal member. The outer conductor shell 511 includes a fitting portion 511*a*, a lid portion 511*b*, a pair of rail portions 511*c* and 511*c*, a pair of clamping portions 511*d* and 511*d*, and a fixed portion 511*e*.

The fitting portion 511*a* may be formed in a cylindrical shape (a tubular shape) in which the Z direction is the axial direction and the insulation housing 512 is coaxially accommodated in a cylindrical hole. An inner peripheral surface of the fitting portion 511*a* contacts an outer peripheral surface of the insulation housing 512. A projection portion 511*f* which projects inward in the radial direction (toward the center axis of the fitting portion 511*a*) along the entire circumference is provided at the lower end of the fitting portion 511*a* (see FIG. 13C). The fitting portion 511*a* is fitted to the ground contact member 603 of the receptacle connector 600 when the projection portion 511*f* engages with a concave portion 603*a* (see FIG. 12) formed in the outer periphery of the ground contact member 603 of the receptacle connector 600.

A rear end portion of the side surface of the fitting portion 511*a* is provided with a slit 511*g* (see FIG. 13D) extending along the Z direction (the direction of engagement) and an outer diameter is configured to widen in the radial direction from the slit 511*g* corresponding to a boundary when being attached to (connected) and removed from (disconnected) the ground contact member 603 of the receptacle connector 600. The slit 511*g* is formed in an entire area of the rear end portion of the side surface of the fitting portion 511*a* in the Z direction. Accordingly, the rear end portion of the fitting portion 511*a* is separated from each other with the slit 511*g* interposed therebetween. In this way, the slit 511*g* comprises a gap portion which is formed between the separated portions at the rear end portion of the fitting portion 511*a*. In addition, the slit 511*g* may not be essentially formed in the entire area in the Z direction and may be formed along the Z direction to a degree in which the fitting portion 511*a* can be enlarged by using the slit 511*g* as a boundary. By way of illustrative example only, the outer diameter of the fitting portion 511*a* which is not enlarged may be, for example, about 2.5 mm and an outer diameter of the fitting portion which is enlarged may be, for example, about 2.7 mm. In some example connectors, the fitting portion 511*a* can be attached to and removed from the ground contact member 603 in an enlarged state and cannot be attached to and removed from the ground contact member 603 in a non-enlarged state.

The lid portion 511*b* covers an opening portion of an upper surface of the fitting portion 511*a*. That is, the lid portion 511*b* covers the opening located at the opposite side from where the receptacle connector 600 is received in the fitting portion 511*a*. The lid portion 511*b* is integrally formed with the fitting portion 511*a*. The lid portion 511*b* covers the opening of the fitting portion 511*a* and extends backward in the X direction to an area provided with the pair of clamping portions 511*d* and 511*d* to be described later.

Figure 13A:
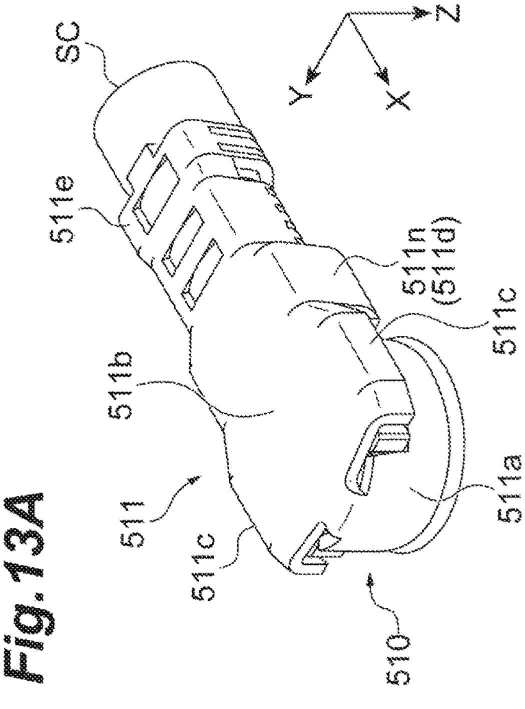
FIG. 13A is a perspective view showing a plug connector included in the electrical connector of FIG. 12.
Figure 13B:
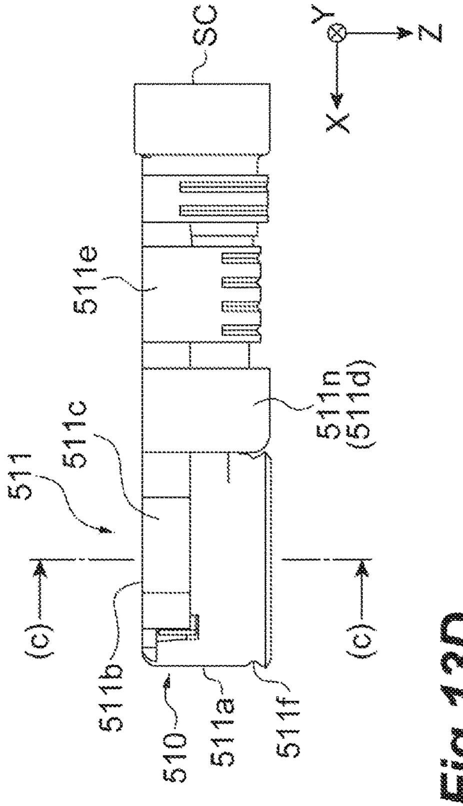
FIG. 13B is a side view.
Figure 13C:
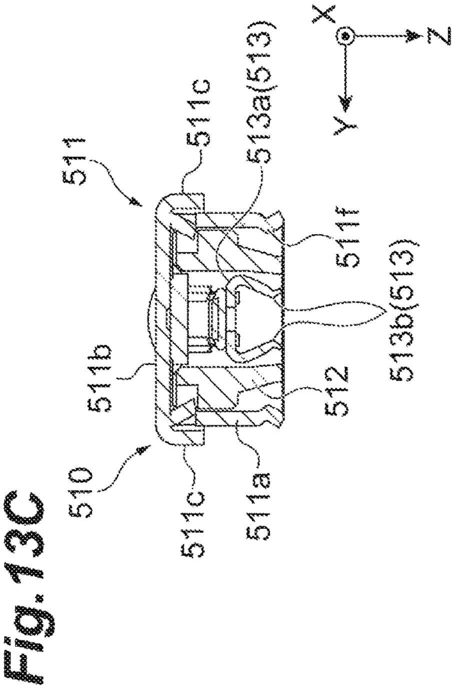
FIG. 13C is a cross-sectional view taken along a line (c)-(c) of FIG. 13B.
Figure 13D:
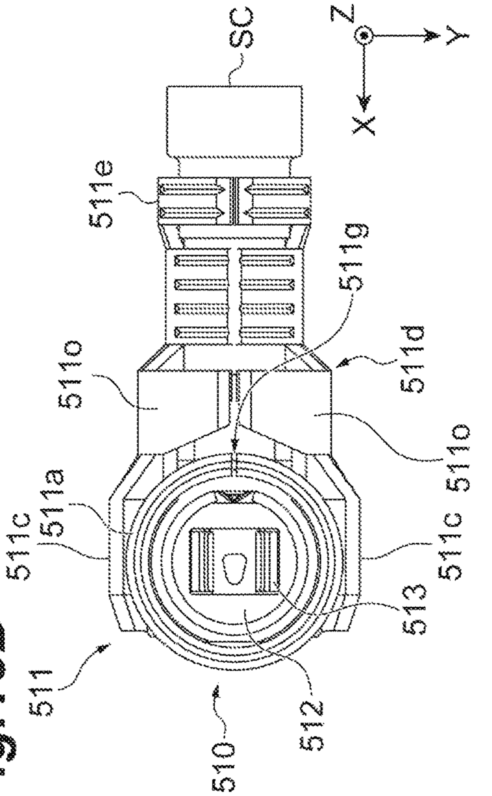
FIG. 13D is a bottom view.

The pair of rail portions 511*c* extend contiguously from the lid portion 511*b* in the X direction as shown in FIG. 13A. The rail portions 511*c* are located on opposite sides of the opening of the fitting portion 511*a*. The pair of rail portions 511*c* is provided in front of the side wall portions 511*n* of the pair of clamping portions 511*d* in the X direction. The length of each of the pair of rail portions 511*c* in the Z direction (a length extending downward from the lid portion 511*b*) is shorter than the length of the pair of clamping portions 511*d*. Further, as shown in FIG. 13D, the rail portions 511*c* are spaced further apart from each other in the Y direction as compared to the pair of clamping portions 511*d* and 511*d*.

The pair of clamping portions 511*d* is formed at a position near the base end of the coaxial cable SC in relation to the fitting portion 511*a* in the X direction (that is, to the rear of the fitting portion 511*a*) to sandwich the coaxial cable SC. The pair of clamping portions 511*d* extends contiguously from the lid portion 511*b*. More specifically, the pair of clamping portions 511D are located on both sides of the lid portion 511*b* and to the rear of the opening of the fitting portion 511*a* of the lid portion 511*b*. The clamping portion 511*d* includes a side wall portion 511*n* which extends contiguously downward from the lid portion 511*b* and a folded-back portion 511*o* which contiguously extends in the Y direction (specifically, a direction facing the opposite clamping portion 511*d*) from the lower end of the side wall portion 511*n*. Each of the folded-back portions 511*o* of the pair of clamping portions 511*d* extends to the center portion of the plug connector 510 in the Y direction (see FIG. 13D).

The fixed portion 511*e* to which the plug connector 510 is attached, is fixed with respect to the coaxial cable SC. The fixed portion 511*e* is located along the coaxial cable SC at a position near the base end of the coaxial cable SC (that is, to the rear of the pair of clamping portions 511*d* and 511*d*) in relation to the pair of clamping portions 511*d* and 511*d* in the X direction. The fixed portion 511*e* is configured to be bendable and is a plate-shaped member having a U-shape when at rest. The fixed portion 511*e* covers the outer peripheries of the protection coating and the outer conductor of the coaxial cable SC and the front end is clamped to be fixed to the coaxial cable SC, so that the plug connector 510 is attached to the coaxial cable SC.

(Housing)

The housing 512 is formed in a cylindrical shape and is an insulator (see FIG. 13C) which holds the inner conductor contact 513 therein and insulates the outer conductor shell 511 and the inner conductor contact 513 from each other. The outer peripheral surface of the insulation housing 512 contacts the inner peripheral surface of the fitting portion 511*a*.

(Inner Conductor Contact)

The inner conductor contact 513 is attached to the insulation housing 512 by press-inserting. The inner conductor contact 513 includes a connection portion 513*a* connected to the inner conductor of the coaxial cable SC and a pair of contact portions 513*b* extending from the connection portion 513*a* in the Z direction (the direction of engagement) and electrically connected to the inner conductor (see FIG. 13C). The pair of contact portions 513*b* is configured to be elastically displaceable in the Z direction and to contact the signal contact member 602 (see FIG. 12) of the receptacle connector 600.

[Locking Member]

Next, a detail of the locking member 530 will be described with reference to FIGS. 14A to 14D. The locking member 530 is attached to the plug connector 510. The locking member 530 is used to securely maintain the state of engagement between the plug connector 510 and the receptacle connector 600 by regulating or prohibiting an increase in the outer diameter of the fitting portion 511*a* of the plug connector 510 after the plug connector 510 and the receptacle connector 600 have been connected to or fitted to each other. The locking member 530 is movable along the X direction while being attached to the plug connector 510. The locking member 530 is formed by, for example, a thin plate-shaped metal member. The locking member 530 includes a pair of arm portions 531, a guide portion 532, and a connection portion 533.

Figures 14A, 14B, 14C, 14D:
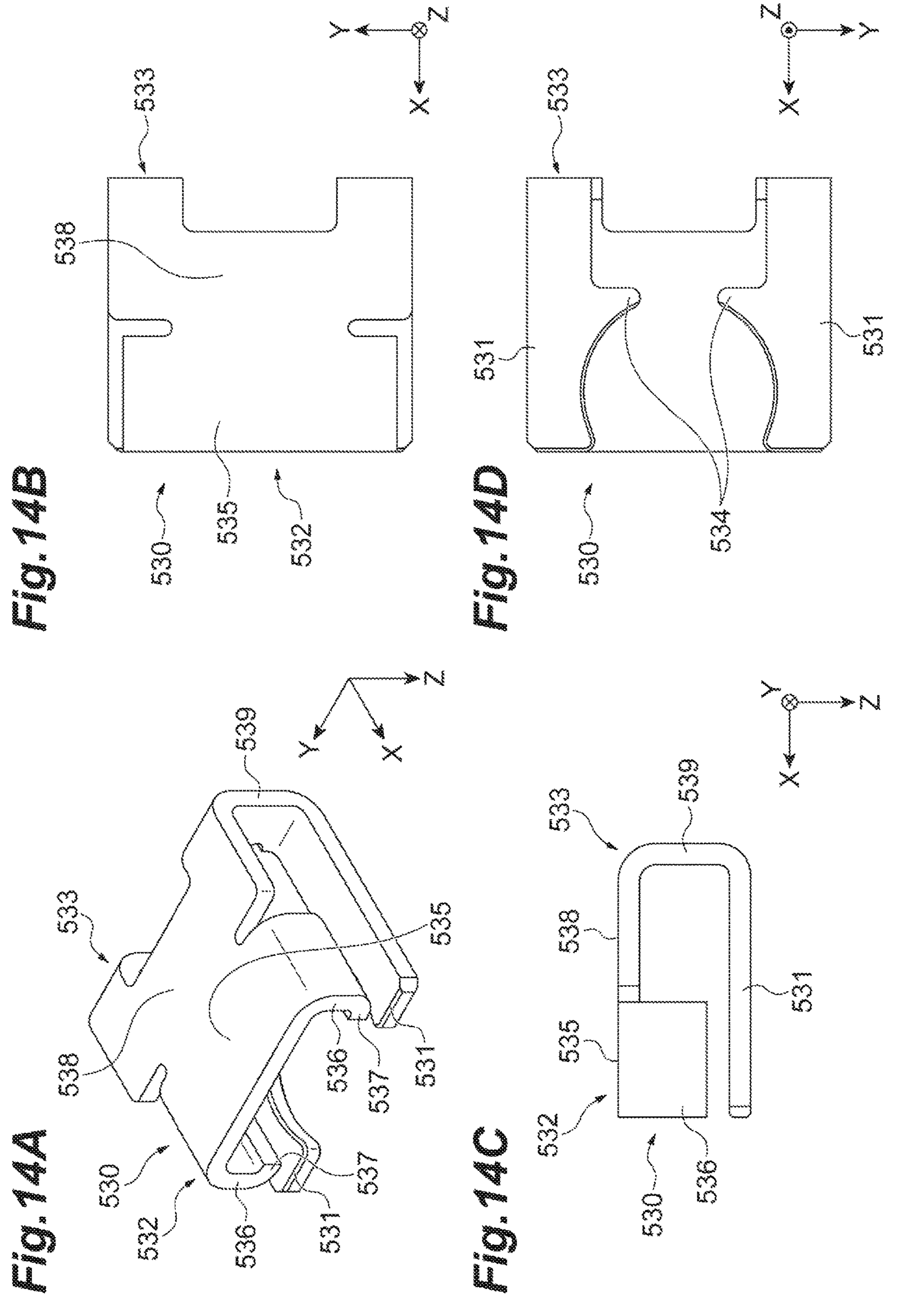
FIG. 14A is a perspective view showing a locking member included in the electrical connector of FIG. 12.
FIG. 14B is a plan view.
FIG. 14C is a side view.
FIG. 14D is a bottom view.

The pair of arm portions 531 can regulate the enlargement of the fitting portion 511*a* by sandwiching the fitting portion 511*a* from the outside in the radial direction (the Y direction). The pair of arm portions 531 extends in the X direction while facing each other in the Y direction. In the pair of arm portions 531, a shape of a portion sandwiching the fitting portion 511*a* (a portion facing the fitting portion 511*a*) is formed into a shape corresponding to the outer shape (that is, the circular shape) of the fitting portion 511*a* (see FIGS. 14D and 17C) and the fitting portion 511*a* can be sandwiched by the arm portions while the arm portions comes into close contact with the outer edge of the fitting portion 511*a*. That is, as shown in FIG. 14D, a portion sandwiching the fitting portion 511*a* in the pair of arm portions 531 has a partially circular shape in the bottom view. The pair of arm portions 531 is configured to be elastically deformable in the vertical direction which is the direction of engagement of the fitting portion 511*a* by using a portion near a connection portion 539 to be described later as a support point.

Figure 17A:
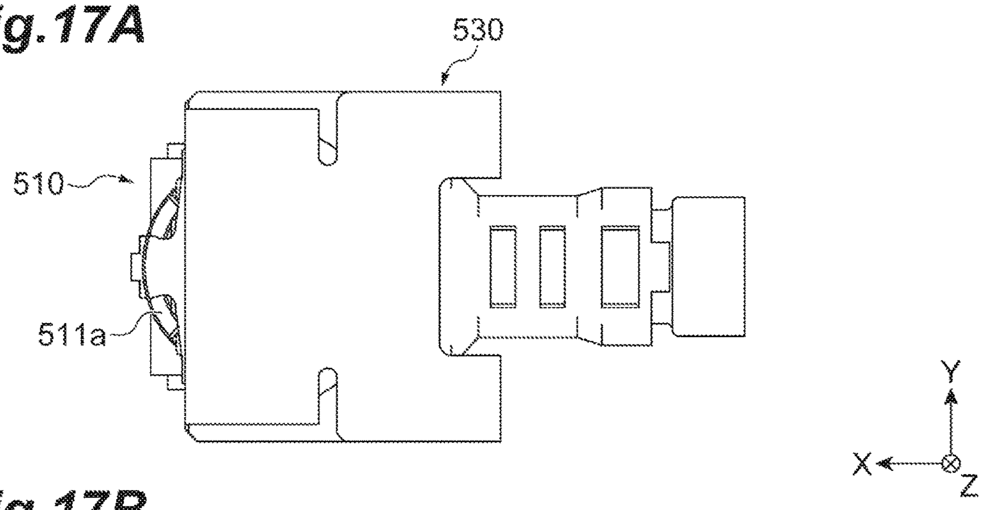
FIG. 17A is a plan view showing a state where the locking member is located at the regulation position.
Figure 17B:
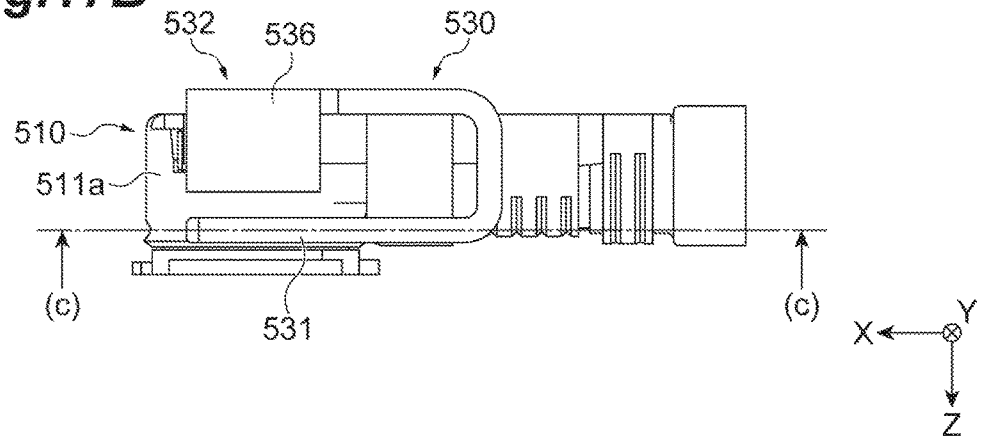
FIG. 17B is a side view.
Figure 17C:
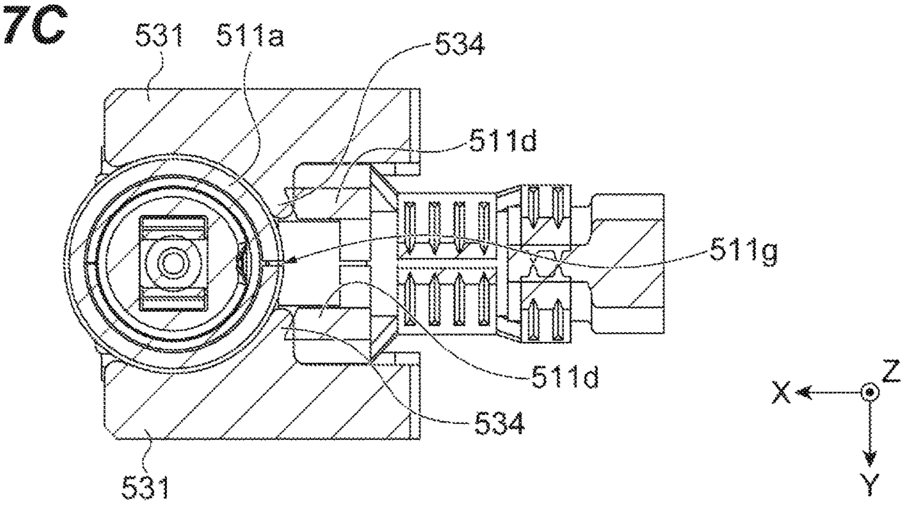
FIG. 17C is a cross-sectional view taken along a line (c)-(c) of FIG. 17B.

The pair of arm portions 531 includes projection portions 534 which extend toward the slit 511*g* along the outer edge of the fitting portion 511*a* when the enlargement of the fitting portion 511*a* is regulated (that is, when the fitting portion 511*a* is sandwiched therebetween) (see FIGS. 14D and 17C). As described above, the pair of arm portions 531 contacts the outer edge of the fitting portion 511*a* while sandwiching the fitting portion 511*a* therebetween and also contacts the projection portions 534 at the outer edge of the fitting portion 511*a* (see FIG. 17C). Further, as shown in FIG. 17C, the projection portion 534 may be configured to contact not only the fitting portion 511*a* but also the clamping portion 511*d* while sandwiching the fitting portion 511*a*. That is, the projection portion 534 may be sandwiched between the fitting portion 511*a* and the clamping portion 511*d* while sandwiching the fitting portion 511*a*. In addition, the projection portion 534 may be configured to not contact both the fitting portion 511*a* and the clamping portion 511*d* at all times while sandwiching the fitting portion 511*a*.

The guide portion 532 guides the movement of the pair of arm portions 531 from the standby position, where the pair of arm portions 531 is located near the coaxial cable SC and behind the fitting portion, to the regulation position where the pair of arm portions 531 sandwiches the fitting portion 511*a* from the outside in the radial direction. In some examples, the movement of the arm portion is guided until the arm portion reaches the regulation position while the locking member 530 is separated from the plug connector 510, and in other examples the movement of the arm portion is guided from a certain area to the other area without the separation of the locking member 530 from the plug connector 510. The regulation position and the standby position indicate the relative positions of the pair of arm portions 531 with respect to the fitting portion 511*a*.

The guide portion 532 includes a base portion 535 and a pair of sliding portions 536. The base portion 535 is a substantially rectangular flat plate which is flush with a base portion 538 of the connection portion 533 to be described later and covers the upper surface of the lid portion 511*b*. The pair of sliding portions 536 extends in the X direction and slides along the pair of rail portions 511*c* to guide the movement of the pair of arm portions 531 in the X direction. The sliding portions 536 are located on both sides of the base portion 535 in the Y direction. The lower ends of the pair of sliding portions 536 are provided with a pair of protrusion portions 537 extending inward toward each other (see FIG. 14A). The upper surfaces of the pair of protrusion portions 537 contact the lower ends of the pair of rail portions 511*c* when the pair of arm portions 531 is guided by the guide portion 532 (see FIG. 15C). The pair of sliding portions 536 covers the pair of rail portions 511*c* from the outside and the pair of protrusion portions 537 provided at the lower ends thereof engages with the lower ends of the pair of rail portions 511*c* (see FIG. 15C). Accordingly, it is possible to suppress or prohibit the locking member 530 from being separated from the plug connector 510 in the direction of engagement.

The connection portion 533 is configured to connect the pair of arm portions 531 to the guide portion 532. The connection portion 533 includes a base portion 538 and a pair of connection portions 539. The base portion 538 is a rectangular flat plate which is flush with the base portion 535 of the guide portion 532, is continuous to the rear end of the base portion 535, and covers the upper surface of the lid portion 511*b*. The pair of connection portions 539 extends contiguously downward from a rear end of the base portion 538 and the lower ends thereof are connected to the rear ends of the pair of arm portions 531.

[Locking Member Attaching and Locking Process]

Next, a process of attaching and locking the locking member 530 to the plug connector 510 will be described in detail with reference to FIGS. 15 to 17. Additionally, in FIGS. 15 to 17, the receptacle connector 600 (see FIG. 12) fitted to the plug connector 510 is not shown.

Figure 15A:
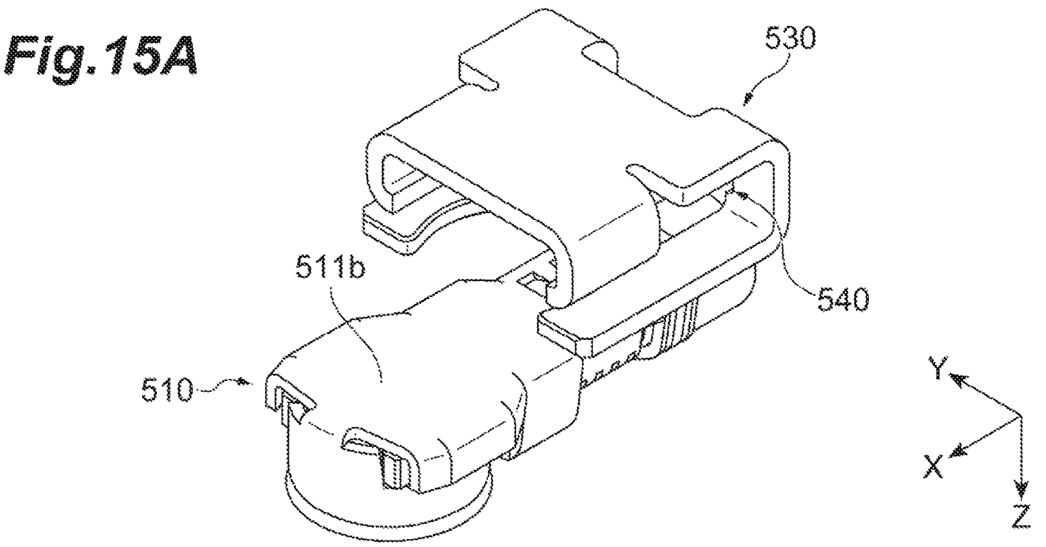
FIG. 15A is a diagram showing a state before the locking member is attached to the plug connector.
Figure 15B:
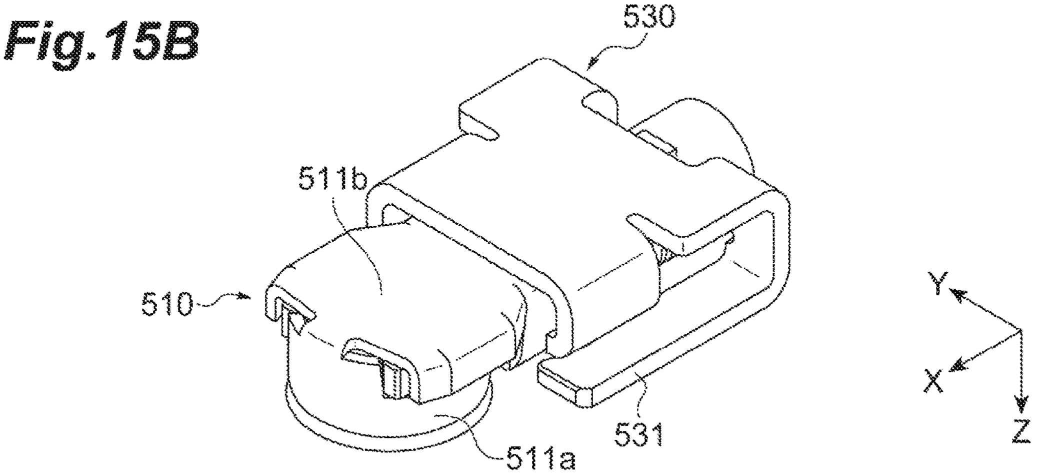
FIG. 15B is a diagram showing a state where the locking member is located at a standby position.
Figure 15C:
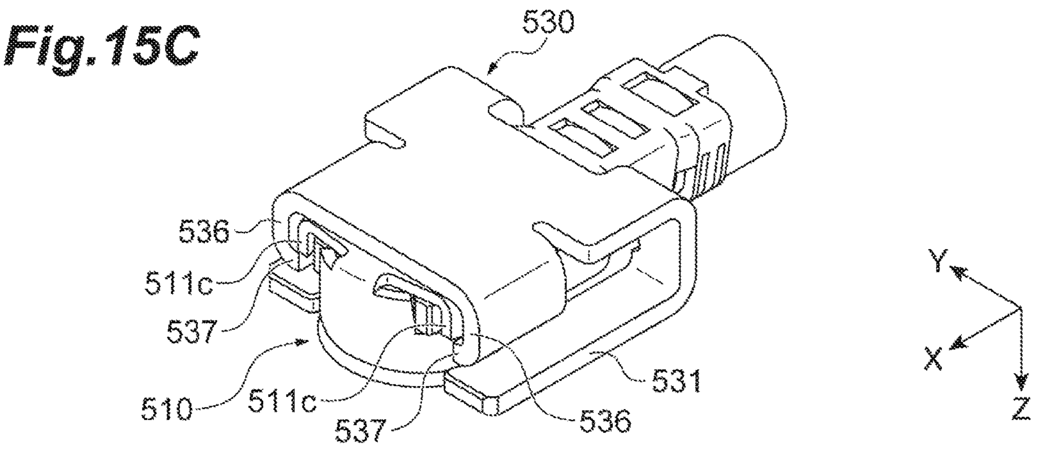
FIG. 15C is a diagram showing a state where the locking member is located at a regulation position.
Figure 16A:
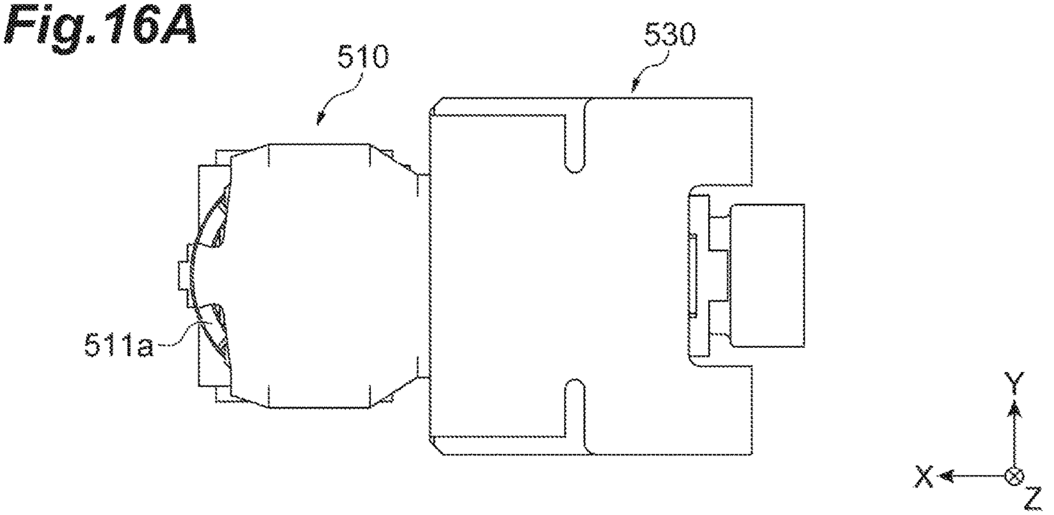
FIG. 16A is a plan view showing a state where the locking member is located at the standby position.
Figure 16B:
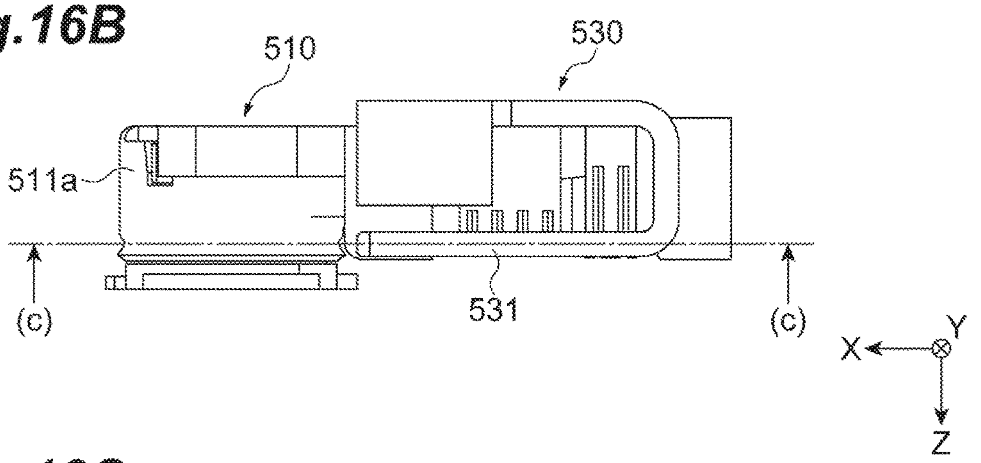
FIG. 16B is a side view.
Figure 16C:
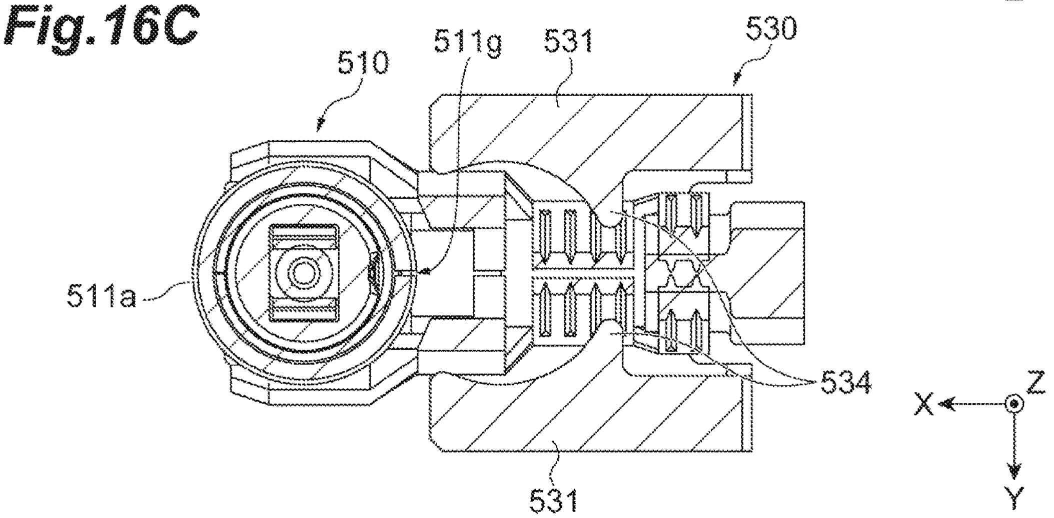
FIG. 16C is a cross-sectional view taken along a line (c)-(c) of FIG. 16B.

As shown in FIG. 15A, the locking member 530 is first attached to the plug connector 510. Specifically, when the locking member 530 set above the plug connector 510 is gradually moved downward, the locking member 530 is attached to the lid portion 511*b*.

As shown in FIG. 15B and FIGS. 16A to 16C, the pair of arm portions 531 of the locking member 530 is located at the standby position when the plug connector 510 and the receptacle connector 600 are fitted to each other. Since the pair of arm portions 531 is located to the rear of the fitting portion 511*a* at the standby position, a force (a sandwiching force) is not applied from the pair of arm portions 531 to the fitting portion 511*a*. In the standby position, the fitting portion 511*a* can be enlarged, and the plug connector 510 is fitted to the receptacle connector 600 while enlarging the fitting portion 511*a*. Specifically, the ground contact member 603 of the receptacle connector 600 is inserted between the enlarged fitting portion 511*a* and the housing 512 (see FIG. 16C). In addition, the locking member 530 may be attached to the lid portion 511*b* after the plug connector 510 and the receptacle connector 600 are fitted to each other.

In the insertion/connection operation, the projection portion 511*f* (see FIG. 13C) of the fitting portion 511*a* engages with the concave portion 603*a* (see FIG. 12) of the ground contact member 603 and the plug connector 510 is fitted to the receptacle connector 600. In addition, the fitting portion 511*a* can be attached to and removed from the ground contact member 603 in an enlarged state and cannot be attached to and removed from the ground contact member 603 in a non-enlarged state.

As shown in FIG. 15C and FIGS. 17A to 17C, the pair of sliding portions 536 of the locking member 530 may be slid forward along the rail portion 511*c* so that the pair of arm portions 531 is located at the regulation position to securely maintain (lock) the state of engagement of the fitting portion 511*a* with the concave portion 603*a*. At the regulation position, as shown in FIG. 17C, the pair of arm portions 531 sandwiches the fitting portion 511*a* from the outside in the radial direction. The pair of atm portions 531 extends toward the slit 511*g* while sandwiching the fitting portion 511*a* so that the projection portions 534 are located next to the fitting portion 511*a*. Accordingly, the enlargement of the fitting portion 511*a* is prohibited or is suppressed at the regulation position. As described above in some example embodiments, the fitting portion 511*a* cannot be attached to and removed from the ground contact member 603 in a non-enlarged state. Since the enlargement of the fitting portion 511*a* is set to be prohibited or set to be suppressed after the fitting, the insertion and the removal of the fitting portion 511*a* are similarly prohibited. Accordingly, the state of engagement between the plug connector 510 and the receptacle connector 600 may be securely maintained.

[Operation and Effect]

Next, the operation and effect of the electrical connector 501 will be described below.

The electrical connector 501 according to some example embodiments includes the plug connector 510 and the locking member 530 attached to the plug connector 510. The plug connector 510 includes the conductive outer conductor shell 511 electrically connected to the ground contact member 603 of the receptacle connector 600, which is a mating connector, and the outer conductor shell 511 includes the cylindrical fitting portion 511*a* fitted to the ground contact member 603. The fitting portion 511*a* has the slit 511*g* formed in the side surface in the direction of engagement and is enlarged to be widened in the radial direction by using the slit 511*g* as a boundary at the time of inserting and removing the fitting portion to and from the ground contact member 603. The locking member 530 includes the pair of arm portions 531 configured to regulate the enlargement of the fitting portion 511*a* by sandwiching the fitting portion 511*a* from the outside in the radial direction. Additionally, the pair of arm portions 531 includes the projection portion 534 extending toward the slit 511*g* along the fitting portion 511*a* while the enlargement of the fitting portion 511*a* is regulated.

In the electrical connector 501, the pair of arm portions 531 of the locking member 530 can regulate or control the enlargement of the fitting portion 511*a*. Accordingly, since the enlargement of the fitting portion 511*a* fitted to the receptacle connector 600 is suppressed, it is possible to securely maintain the state of engagement between the plug connector 510 and the receptacle connector 600. Here, the fitting portion 511*a* can be enlarged while being widened by using the slit 511*g* as a boundary. For this reason, it is desirable to control the size of the slit 511*g* in order to effectively suppress the enlargement. In this regard, in the electrical connector 501, the pair of arm portions 531 and 531 includes the projection portions 534 and 534 extending toward the slit 511*g* along the fitting portion 511*a* and the vicinity next to the slit 511*g* is pressed by the projection portions 534 and 534. Accordingly, since it is possible to further appropriately suppress or prohibit the enlargement of the fitting portion 511*a*, it is possible to further securely maintain the state of engagement between the plug connector 510 and the receptacle connector 600. Further, by employing the locking member 530 in the electrical connector 501 to regulate the enlargement of the fitting portion 511*a*, it is also possible to easily perform a removal operation by disengaging the locking member 530 from the fitting portion 511*a*, such as when there is a need to perform the removal operation after the fitting. That is, according to the electrical connector 501, it is possible to easily perform a series of operations relating to the inserting/connecting operation and securely maintaining the state of engagement without using an adhesive.

The plug connector 510 is attached to one end of the coaxial cable SC and the locking member 530 is movable along the axial direction (the X direction) corresponding to the extension direction of the coaxial cable SC. In this way, since the locking is realized by moving the locking member 530 in a direction (e.g., the X direction) different from the direction of engagement (e.g., the Z direction) of the plug connector 510, it is possible to clearly distinguish the fitting/engagement operation and the locking operation and thus to improve the functionality.

The locking member 530 further includes the guide portion 532 which guides the movement of the pair of arm portions 531 from the standby position, where the pair of arm portions 531 is located near the base end of the coaxial cable SC in relation to the fitting portion 511*a* in the X direction, to the regulation position where the pair of arm portions 531 sandwiches the fitting portion 511*a* from the outside in the radial direction. Accordingly, for example, when inserting and removing the fitting portion 511*a* to and from the ground contact member 603, the insertion and the removal are easily performed while the pair of arm portions 531 is located at the standby position. Then, when fitting the fitting portion 511*a* of the plug connector 510 to the ground contact member 603 of the receptacle connector 600, the state of engagement can be securely maintained while the pair of arm portions 531 is located at the regulation position. That is, it is possible to securely maintain the state of engagement between the plug connector 510 and the receptacle connector 600 while securing the functionality relating to the insertion and the removal of the plug connector 510. Further, since the standby position is set to a (rear) position near the base end of the coaxial cable SC in relation to the fitting portion 511*a*, the pair of arm portions 531 is not disposed to the front of the fitting portion 511*a* during the locking operation, in which the pair of arm portions is moved from the standby position to the regulation position. Accordingly, by disposing the locking member 530 in an area to the rear of the plug connector 510 in the printed wiring board 700, it is possible to mount other electronic components in the front area of the printed wiring board 700 and to improve the mounting efficiency of the printed wiring board 700.

The outer conductor shell 511 further includes the lid portion 511*b* which covers an opening opposite to an opening that is configured to receive the ground contact member 603 in the fitting portion 511*a*, and the rail portion 511*c* which contiguously extends from the lid portion 511*b* in the X direction. Additionally, the guide portion 532 includes the sliding portion 536 which extends in the X direction and slides along the rail portion 511*c* to guide the movement of the pair of arm portions 531 in the X direction. Since the sliding portion 536 moves along the rail portion 511*c* of the plug connector 510, it is possible to easily move the pair of arm portions 531.

The sliding portion 536 covers the outside of the rail portion 511*c* and engages with the rail portion 511*c*. Since the sliding portion 536 engages with the rail portion 511*c*, it is possible to suppress or prohibit the separation of the locking member 530 from the plug connector 510 in the direction of engagement.

The outer conductor shell 511 further includes the pair of clamping portions 511*d* which is provided at a position near the base end of the coaxial cable SC in relation to the fitting portion 511*a* in the X direction. The clamping portions 511*d* may be configured to sandwich the coaxial cable SC and the projection portions 534 may be configured to contact the pair of clamping portions 511*d* while the enlargement of the fitting portion 511*a* is regulated. When the projection portion 534 that extends toward the slit 511*g* along the fitting portion 511*a* contacts the clamping portion 511*d*, the projection portion 534 is sandwiched between the fitting portion 511*a* and the clamping portion 511*d*. Accordingly, since the position of the projection portion 534 that regulates the enlargement in the vicinity of the slit 511*g* is easily fixed, it is possible to further securely maintain the state of engagement between the plug connector 510 and the receptacle connector 600.

The pair of arm portions 531 may be elastically displaceable in the vertical direction which is the direction of engagement. Since the pair of arm portions 531 is elastically deformable, the projection portion 534 can be moved over other interfering components (for example the clamping portion 511*d*) when sliding the pair of arm portions 531. That is, it is possible to further easily move the pair of arm portions 531 to avoid interference. Further, since the projection portion 534 may be configured to extend toward the slit 511*g* in order to avoid the clamping portion 511*d*, it is possible to easily fix the position of the projection portion 534 and to further securely maintain the state of engagement between the plug connector 510 and the receptacle connector 600.

ADDITIONAL EMBODIMENTS

An electrical connector comprising: a first contact configured to be electrically connected to a second contact of a mating connector, a cylindrical fitting portion having an outer diameter that is configured to become temporarily enlarged in response to the second contact being inserted into the cylindrical fitting portion; and a locking member including a regulation portion configured to prohibit a subsequent enlargement of the cylindrical fitting portion in order to securely maintain the electrical connection between the first contact and the second contact.

A locking member of an electrical connector comprising: a regulation portion configured to regulate an enlargement of a cylindrical fitting portion of the electrical connector which is electrically connected to a contact of a mating connector, wherein an outer diameter of the cylindrical fitting portion is temporarily enlarged when the mating connector is inserted into the cylindrical fitting portion, and wherein the regulation portion is configured to prohibit a subsequent enlargement of the cylindrical fitting portion in order to securely maintain an electrical connection between the electrical connector and the mating connector It is to be understood that not all aspects, advantages and features described herein may necessarily be achieved by, or included in, any one particular example embodiment. Indeed, having described and illustrated various examples herein, it should be apparent that other examples may be modified in arrangement and detail. We claim all modifications and variations coming within the spirit and scope of the subject matter claimed herein.

What is claimed is:

1. An electrical connector comprising:
a first connector; and
a locking member attached to the first connector,
wherein the first connector includes a first contact having a conductive property and configured to be electrically connected to a second contact of a second connector which is a mating connector, the first contact includes a cylindrical fitting portion configured to be attached to the second contact of the second connector,
wherein an outer diameter of the cylindrical fitting portion is configured to be temporarily enlarged when the cylindrical fitting portion is being attached to the second contact of the second connector,
wherein the locking member includes:
a regulation portion configured to prohibit an enlargement of the cylindrical fitting portion associated with removing the cylindrical fitting portion from the second contact of the second connector; and
a guide portion configured to guide the regulation portion as it moves with respect to the cylindrical fitting portion, and
wherein the guide portion is configured to guide the regulation portion as it moves between a regulation position associated with regulating the enlargement of the cylindrical fitting portion and a standby position in which the enlargement of the cylindrical fitting portion is not prohibited by the regulation portion.

2. The electrical connector according to claim 1,
wherein the regulation portion includes a pair of arm portions configured to regulate the enlargement of the cylindrical fitting portion by sandwiching the cylindrical fitting portion from an outside radial direction.

3. The electrical connector according to claim 2,
wherein a gap between the pair of arm portions is narrower than the outer diameter of the cylindrical fitting portion when it is enlarged.

4. The electrical connector according to claim 3,
wherein the guide portion is configured to guide the movement of the regulation portion in a locking direction intersecting a direction of engagement of the cylindrical fitting portion.

5. The electrical connector according to claim 4,
wherein the electrical connector is attached to one end of a cable, and
wherein the locking direction in which the guide portion guides the movement of the regulation portion is in an axial direction of the cable.

6. The electrical connector according to claim 5,
wherein the first connector includes a lid portion covering a surface opposite to a side of receiving the second contact of the second connector in a fitting direction of the cylindrical fitting portion and a rail portion provided in the lid portion and extending in the axial direction, and
the guide portion includes a sliding portion extending in the axial direction and sliding along the rail portion to guide the movement of the regulation portion in the axial direction.

7. The electrical connector according to claim 6,
wherein at least one of the sliding portion and the rail portion includes a first protrusion portion protruding toward the other side and the other thereof includes an engagement portion engaging with the first protrusion portion after a position of the regulation portion reaches the regulation position by the sliding of the sliding portion.

8. The electrical connector according to claim 6,
wherein the guide portion includes a flat portion provided to cover the lid portion configured to face the pair of arm portions in the direction of engagement and to hold the sliding portion, and
wherein the flat portion is provided with an opening.

9. The electrical connector according to claim 3,
wherein the guide portion includes a pair of extension portions that extend from the pair of arm portions of the regulation portion,
wherein the pair of extension portions is configured to sandwich the cylindrical fitting portion from the outside radial direction while the regulation portion is disposed at the standby position, and wherein a gap between the pair of extension portions is wider than a gap between the pair of arm portions.

10. The electrical connector according to claim 9, wherein at least one of the pair of extension portions includes a second protrusion portion protruding toward the other side, and the second protrusion portion is provided at an end portion opposite to a position continuous to the arm portion in the extension portion and protrudes to prevent the cylindrical fitting portion from passing between the pair of extension portions while contacting the cylindrical fitting position.

11. The electrical connector according to claim 3, wherein the guide portion includes a pair of extension portions that extend from the pair of arm portions of the regulation portion, wherein the pair of extension portions sandwiches the cylindrical fitting portion from the outside radial direction while the regulation portion is disposed at the standby position, and wherein an amount of rigidity of the pair of extension portions is lower than an amount of rigidity of the pair of arm portions.

12. The electrical connector according to claim 1, wherein the first connector is a plug connector attached to one end of a coaxial cable, the second connector is a receptacle connector mounted on a substrate electrically connected to the coaxial cable and fitted to the plug connector, and the second contact of the second connector is a ground contact connected to a ground terminal of the substrate.

13. An electrical connector comprising:

a first connector; and a locking member attached to the first connector, wherein the first connector includes a first contact having a conductive property and configured to be electrically connected to a second contact of a second connector which is a mating connector, the first contact includes a cylindrical fitting portion configured to be attached to the second contact of the second connector, wherein an outer diameter of the cylindrical fitting portion is configured to be temporarily enlarged when the cylindrical fitting portion is being attached to the second contact of the second connector, wherein the cylindrical fitting portion has a slit that is oriented in the direction of engagement and that is configured to become enlarged when the second contact of the mating connector is inserted into the cylindrical fitting portion, wherein the locking member includes a regulation portion configured to prohibit an enlargement of the cylindrical fitting portion associated with removing the cylindrical fitting portion from the second contact of the second connector, wherein the regulation portion of the locking member includes a pair of arm portions configured to regulate the enlargement of the cylindrical fitting portion by sandwiching the cylindrical fitting portion from an outside radial direction, and wherein the pair of arm portions includes a pair of opposing projection portions extending toward the slit along the cylindrical fitting portion while the enlargement of the cylindrical fitting portion is regulated.

14. The electrical connector according to claim 13, wherein the electrical connector is attached to one end of a cable, and wherein the locking member is configured to move along a longitudinal axial direction of the cable.

15. The electrical connector according to claim 14, wherein the locking member further includes a guide portion configured to guide the movement of the pair of arm portions from a standby position, in which the pair of arm portions is located near a base end of the cable, to a regulation position in which the pair of arm portions sandwiches the cylindrical fitting portion from the outside radial direction.

16. The electrical connector according to claim 15, wherein the first contact includes a lid portion covering an opening opposite to an opening receiving the second contact of the second connector in the fitting portion and a rail portion provided to be continuous to the lid portion and extending in the axial direction, and the guide portion includes a sliding portion extending in the axial direction and sliding along the rail portion to guide the movement of the pair of arm portions in the axial direction.

17. The electrical connector according to claim 16, wherein the sliding portion at least partially surrounds the rail portion and is configured to engage with the rail portion.

18. The electrical connector according to claim 14, wherein the first contact further includes a clamping portion configured to sandwich the cable at a position near a base end of the cable in relation to the cylindrical fitting portion in the longitudinal axial direction, and wherein the pair of opposing projection portions is configured to contact the clamping portion while regulating the enlargement of the cylindrical fitting portion.

19. The electrical connector according to claim 13, wherein the pair of arm portions is elastically displaceable in a vertical direction corresponding to a fitting direction of the cylindrical fitting portion.

20. A locking member of an electrical connector comprising:

a regulation portion configured to regulate an enlargement of a cylindrical fitting portion of the electrical connector which is electrically connected and attached to a contact of a mating connector; and a guide portion configured to guide the movement of the regulation portion with respect to the cylindrical fitting portion, wherein an outer diameter of the cylindrical fitting portion is configured to be temporarily enlarged when the electrical connector is being attached to the contact of the mating connector, wherein the regulation portion is configured to prohibit an enlargement of the cylindrical fitting portion associated with removing the cylindrical fitting portion from the contact of the mating connector, and wherein the guide portion guides the regulation portion to be movable between a regulation position of regulating the enlargement of the cylindrical fitting portion and a standby position of not regulating the enlargement.

21. The locking member according to claim 20, wherein the regulation portion includes a pair of arm portions configured to regulate the enlargement of the cylindrical fitting portion by sandwiching the cylindrical fitting portion from an outside radial direction.

22. The locking member according to claim 21, wherein a gap between the pair of arm portions is narrower than the outer diameter of the cylindrical fitting portion when it is enlarged.

23. A locking member of an electrical connector comprising:

a regulation portion configured to regulate an enlargement of a cylindrical fitting portion of the electrical connector which is electrically connected and attached to a contact of a mating connector, wherein the cylindrical fitting portion has a slit that is oriented in a direction of engagement and that is configured to become enlarged when the contact of the mating connector is inserted into the cylindrical fitting portion, wherein the a regulation portion includes:

a pair of arm portions configured to regulate the enlargement of the cylindrical fitting portion by sandwiching the cylindrical fitting portion from an outside radial direction; and a pair of opposing projection portions extending toward the slit along the cylindrical fitting portion while the enlargement of the cylindrical fitting portion is regulated, wherein an outer diameter of the cylindrical fitting portion is configured to be temporarily enlarged when the electrical connector is being attached to the contact of the mating connector, and wherein the regulation portion is configured to prohibit the enlargement of the cylindrical fitting portion associated with removing the cylindrical fitting portion from the contact of the mating connector.

24. The locking member according to claim 23, wherein the locking member is configured to move along a cable attached to the electrical connector, and wherein the locking member further includes a guide portion configured to guide the movement of the pair of arm portions from a standby position, in which the pair of arm portions is located near a base end of the cable, to a regulation position in which the pair of arm portions sandwiches the cylindrical fitting portion from the outside radial direction.

25. The locking member according to claim 24, wherein the electrical connector includes a lid portion covering an opening opposite to an opening receiving the contact of the mating connector in the fitting portion and a rail portion extending in a longitudinal axial direction of the cable, and wherein the guide portion includes a sliding portion to guide the movement of the pair of arm portions in the longitudinal axial direction.

26. The locking member according to claim 24, wherein the electrical connector includes a clamping portion configured to sandwich the cable at a position near a base end of the cable in relation to the cylindrical fitting portion in a longitudinal axial direction of the cable, and wherein the pair of opposing projection portions is configured to contact the clamping portion while regulating the enlargement of the cylindrical fitting portion.

* * * * *